US012588107B2

(12) United States Patent
Zong et al.

(10) Patent No.: US 12,588,107 B2
(45) Date of Patent: Mar. 24, 2026

(54) MESSAGE TRANSMISSION METHOD, APPARATUS, AND STORAGE MEDIUM

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 464 days.

(21) Appl. No.: 17/172,699

(22) Filed: Feb. 10, 2021

(65) Prior Publication Data

US 2021/0168906 A1    Jun. 3, 2021

Related U.S. Application Data

(63) Continuation of application No. PCT/CN2019/100434, filed on Aug. 13, 2019.

(30) Foreign Application Priority Data

Aug. 13, 2018    (CN) ......................... 201810918783.X

(51) Int. Cl.
| | |
|---|---|
| *H04L 29/08* | (2006.01) |
| *H04W 16/02* | (2009.01) |
| *H04W 48/16* | (2009.01) |
| *H04W 48/18* | (2009.01) |

(Continued)

(52) U.S. Cl.
CPC ......... *H04W 88/182* (2013.01); *H04W 48/16* (2013.01); *H04W 48/18* (2013.01); *H04W 88/184* (2013.01); *H04W 92/02* (2013.01)

(58) Field of Classification Search
None
See application file for complete search history.

(56) References Cited

U.S. PATENT DOCUMENTS

| | | | | |
|---|---|---|---|---|
| 10,848,576 | B2 * | 11/2020 | Stammers | .............. H04L 67/141 |
| 11,350,274 | B2 * | 5/2022 | Watfa | ...................... H04W 8/02 |
| 2013/0337822 | A1 | 12/2013 | Rubin et al. | |

(Continued)

FOREIGN PATENT DOCUMENTS

| | | |
|---|---|---|
| CN | 101924768 A | 12/2010 |
| CN | 104662994 A | 5/2015 |

(Continued)

OTHER PUBLICATIONS

SGPP TR 23.742 V0.3.0 (Jul. 2018), 3rd Generation Partnership Project; Technical Specification Group Services and System Aspects;Study on Enhancements to the Service-Based Architecture(Release 16), total 66 pages.

(Continued)

*Primary Examiner* — Sithu Ko
(74) *Attorney, Agent, or Firm* — Conley Rose, P.C.

(57) ABSTRACT

A message transmission method includes receiving, by a first transmission proxy, a first message from a first service instance, where the first message includes an identifier of a first service set, obtaining, by the first transmission proxy, a second service instance in the first service set based on the identifier that is of the first service set and that is included in the received first message, and sending, by the first transmission proxy, a second message to the second service instance based on the first message.

17 Claims, 10 Drawing Sheets

(51) Int. Cl.
*H04W 88/18* (2009.01)
*H04W 92/02* (2009.01)

(56) References Cited

U.S. PATENT DOCUMENTS

| | | | | |
|---|---|---|---|---|
| 2014/0244728 | A1* | 8/2014 | Endo | H04L 67/1031 |
| | | | | 709/203 |
| 2016/0094632 | A1 | 3/2016 | Jain et al. | |
| 2018/0199279 | A1* | 7/2018 | Baek | H04W 16/14 |
| 2018/0376414 | A1* | 12/2018 | Zeng | H04W 8/02 |
| 2019/0141606 | A1* | 5/2019 | Qiao | H04W 64/003 |
| 2019/0200208 | A1* | 6/2019 | Chandramouli | H04W 80/10 |
| 2019/0260803 | A1* | 8/2019 | Bykampadi | H04W 12/10 |
| 2019/0306251 | A1* | 10/2019 | Talebi Fard | H04W 76/10 |
| 2019/0327317 | A1 | 10/2019 | Lu et al. | |
| 2019/0335392 | A1* | 10/2019 | Qiao | H04W 48/16 |
| 2021/0127265 | A1* | 4/2021 | Chandramouli | H04L 67/51 |
| 2021/0282003 | A1* | 9/2021 | Li | H04W 8/00 |
| 2021/0321245 | A1* | 10/2021 | Landais | H04W 8/06 |
| 2021/0385286 | A1* | 12/2021 | Wang | H04L 67/51 |

FOREIGN PATENT DOCUMENTS

| | | |
|---|---|---|
| CN | 105812488 A | 7/2016 |
| CN | 106031128 A | 10/2016 |
| CN | 107995045 A | 5/2018 |
| CN | 108243225 A | 7/2018 |
| CN | 108270621 A | 7/2018 |
| CN | 108270823 A | 7/2018 |
| WO | 2018128499 A1 | 7/2018 |

OTHER PUBLICATIONS

Ravishankar Ravindran et al., "Deploying ICN in 3GPP S SG NextGen Core Architecture",2018 IEEE 5G World Forum,Jul. 9, 2018, total 8 pages.

Dan Wang et al., "Service-based Architecture in 5G by NGMN Alliance", V1.0,19—Jan. 2018, 17 pages.

China Mobile, "Further clarification for distributed service framework", 3GPP TSG-SA WG2 Meeting #128 S2-186498, Vilnius, Lithuania, Jul. 2-6, 2018, 3 pages.

China Mobile, "Further clarification for distributed service framework", 3GPP TSG-SA WG2 Meeting #128 S2-187517, Vilnius, Lithuania, Jul. 2-6, 2018, 3 pages.

3GPP TS 23.501 V15.2.0, "3rd Generation Partnership Project; Technical Specification Group Services and System Aspects; System Architecture for the 5G System; Stage 2 (Release 15)," Jun. 2018, 216 pages.

3GPP TS 23.502 V15.2.0, "3rd Generation Partnership Project; Technical Specification Group Services and System Aspects; Procedures for the 5G System; Stage 2 (Release 15)," Jun. 2018, 308 pages.

3GPP TS 29.500 V15.0.0, "3rd Generation Partnership Project; Technical Specification Group Core Network and Terminals; 5G System; Technical Realization of Service Based Architecture; Stage 3 (Release 15)," Jun. 2018, 28 pages.

3GPP TS 29.510 V15.0.0, "3rd Generation Partnership Project; Technical Specification Group Core Network and Terminals; 5G System; Network Function Repository Services; Stage 3 (Release 15)," Jun. 2018, 64 pages.

Sony, "NR-NTN—Text Proposal for TR 38.811 chap 6 NTN channel modelling," 3GPP TSG RAN WG2 Meeting #102, R1-1807792, May 21-25, 2018, 33 pages.

Ericsson, "guami-Type in RRC Setup Complete," 3GPP TSG-RAN WG2 #102, R2-1807912, May 21-25, 2018, 3 pages.

* cited by examiner

MESSAGE TRANSMISSION METHOD, APPARATUS, AND STORAGE MEDIUM

CROSS-REFERENCE TO RELATED APPLICATIONS

This application is a continuation of International Patent Application No. PCT/CN2019/100434 filed on Aug. 13, 2019, which claims priority to Chinese Patent Application No. 201810918783.X filed on Aug. 13, 2018. The disclosures of the aforementioned applications are hereby incorporated by reference in their entireties.

TECHNICAL FIELD

This application relates to the communications field, and in particular, to a message transmission method, an apparatus, and a storage medium.

BACKGROUND

With the development of communications technologies, to meet diversified service requirements, functions of an existing network element may be decoupled, and become independent and modular functions. Then, the functions are organized based on service requirements in a service-oriented manner (namely, a service instance manner), to support a plurality of access modes and requirements of a plurality of services.

In other approaches, when a first service instance needs a second service instance to provide a service for the first service instance, the first service instance needs to send a request message to the second service instance, so that the second service instance provides a service for the first service instance based on to-be-processed content in the request message.

Currently, a process in which the first service instance sends the request message to the second service instance is as follows. The first service instance determines an address of the second service instance, and then the first service instance sends the request message to the second service instance. After the second service instance receives the request message sent by the first service instance, if the second service instance determines that current load is relatively heavy, the second service instance needs to feed back an overload response to the first service instance, so that the first service instance reselects a new service instance to provide a service for the first service instance. In this way, load balancing of the second service instance requires participation of both the first service instance and the second service instance. Consequently, service logic of the first service instance and service logic of the second service instance are relatively complex.

SUMMARY

This application provides a message transmission method, an apparatus, and a storage medium, to simplify complex service logic of a service instance.

According to a first aspect, this application provides a message transmission method, where the method is used for a first transmission proxy. The first transmission proxy corresponds to at least one service set, one service set includes at least one service instance, and the first transmission proxy is connected to a service instance in the service set. The method includes the first transmission proxy receives a first message from a first service instance. The first message includes an identifier of a first service set. The first transmission proxy obtains a second service instance in the first service set based on the identifier of the first service set. The first transmission proxy sends a second message to the second service instance based on the first message.

Based on this solution, the first message from the first service instance carries the identifier of the first service set instead of an identifier of a service instance in the first service set, so that the first transmission proxy can select the second service instance based on a load status of each service instance in the first service set. This conveniently supports load balancing and redundancy processing of the first service set.

Further, the first transmission proxy may select the second service instance for the first service instance from the first service set, without participation of the second service instance and/or the first service instance. In this way, the service instance may be decoupled from load balancing, and this helps simplify service logic of the service instance.

In a possible implementation, the first transmission proxy may determine, based on the identifier of the first service set, the first service set from the at least one service set corresponding to the information that is locally stored on the first transmission proxy and that is about the service set, and the first transmission proxy selects the second service instance from the first service set.

Before the first transmission proxy receives the first message from the first service instance, the first transmission proxy may receive capability information of a requested service instance from the first service instance. The first transmission proxy obtains the identifier of the first service set corresponding to the capability information of the requested service instance. The first transmission proxy sends the identifier of the first service set to the first service instance.

That the first transmission proxy obtains the identifier of the first service set corresponding to the capability information of the requested service instance includes the following two implementations.

Implementation 1. When the identifier of the first service set is locally stored on the first transmission proxy, the first transmission proxy may determine, based on local information, the first service set corresponding to the capability information of the requested service instance. In this way, the first service instance can quickly obtain the identifier of the first service set.

Implementation 2. When the identifier of the first service set is not locally stored on the first transmission proxy, the first transmission proxy sends the capability information of the requested service instance to a network registration network element. The first transmission proxy receives, from the network registration network element, the identifier of the first service set corresponding to the capability information of the requested service instance.

To enable the first service instance to directly send the first message to a transmission proxy corresponding to the first service set, the first transmission proxy sends, to the first service instance, an identifier of the transmission proxy corresponding to the first service set.

In an implementation, after the first transmission proxy sends the capability information of the requested service instance to the network registration network element, the first transmission proxy receives, from the network registration network element, an identifier of at least one transmission proxy corresponding to the first service set. The first transmission proxy selects, from the at least one transmission proxy corresponding to the first service set, the identifier of the transmission proxy corresponding to the first service set. The first transmission proxy sends, to the first service instance, the identifier of the transmission proxy corresponding to the first service set.

Further, the first transmission proxy may select, based on a weight of the at least one transmission proxy corresponding to the first service set, the transmission proxy corresponding to the first service set.

In a possible implementation, the first transmission proxy obtains, from the transmission proxy corresponding to the first service set, at least one service instance corresponding to the first service set. The first transmission proxy selects the second service instance from the obtained at least one service instance.

In another implementation, the first transmission proxy determines, based on the local information, the identifier of the transmission proxy corresponding to the first service set.

In still another possible implementation, after the first service instance receives the identifier, sent by the first transmission proxy, of the transmission proxy corresponding to the first service set, the first service instance may directly send the first message to the transmission proxy corresponding to the first service set.

In a possible implementation, after the first transmission proxy receives the identifier, from the network registration network element, of the transmission proxy corresponding to the first service set, the first transmission proxy may directly send the first message to the transmission proxy corresponding to the first service set.

When the service instance provides a service, the service instance may be registered with the first transmission proxy. The following provides two manners of registering a third service instance with the first transmission proxy.

Manner 1. The first transmission proxy receives a third message from the third service instance. The third message includes capability information of the third service instance and an identifier of the third service instance, and the third message is used to request to register the third service instance with the first transmission proxy. The first transmission proxy obtains a second service set corresponding to the capability information of the third service instance, and sends an identifier of the second service set to the third service instance.

Further, if the second service set corresponding to the capability information of the third service instance exists on the first transmission proxy, the first transmission proxy sends the identifier of the second service set to the third service instance. Alternatively, if a service set corresponding to the capability information of the third service instance does not exist on the first transmission proxy, the first transmission proxy creates the second service set to which the third service instance belongs, and sends the identifier of the second service set to the third service instance. The second service set corresponds to the capability information of the third service instance.

Manner 2. The first transmission proxy receives a fourth message from the third service instance. The fourth message includes the identifier of the third service instance, the identifier of the second service set to which the third service instance belongs, and the capability information of the third service instance. The first transmission proxy adds the third service instance to the second service set to which the third service instance belongs.

In a possible implementation, that the first transmission proxy adds the third service instance to the second service set to which the third service instance belongs may be specifically, if the second service set to which the third service instance belongs exists, the first transmission proxy adds the third service instance to the second service set. Alternatively, if the second service set to which the third service instance belongs does not exist, the first transmission proxy creates the second service set to which the third service instance belongs, and adds the third service instance to the second service set. The second service set corresponds to the capability information of the third service instance.

Further, if the second service set to which the third service instance belongs does not exist in the transmission proxy, the first transmission proxy sends a fifth message to the network registration network element. The fifth message includes the identifier of the second service set and the capability information of the third service instance corresponding to the second service set. The fifth message is used to request to register the second service set with the network registration network element. In this way, a service instance may not be connected to the first transmission proxy, and the second service set to which the third service instance belongs may be discovered through the network registration network element.

In a possible implementation, the first message is a Hypertext Transfer Protocol (HTTP) message, the HTTP message includes a message header, and the message header includes the identifier of the first service set. Therefore, a service instance defined in release 15 (R15) may support communication between service instances or transmission proxies of a new release without any modification. This supports better forward compatibility.

In a possible implementation, that the first transmission proxy receives the first message from the first service instance may include at least two implementations. Implementation 1. The first transmission proxy receives the first message from the transmission proxy corresponding to the first service set. The first message from the transmission proxy corresponding to the first service set is from the first service instance. Implementation 2. The first transmission proxy receives the first message sent by the first service instance.

According to a second aspect, this application provides a message transmission method. The method includes a first service instance obtains an identifier of a first service set. The first service set includes at least one service instance, and the at least one service instance includes a second service instance. In this way, the first service instance may obtain the identifier of the first service set to which the second service instance belongs. The first service instance sends a first message to the first transmission proxy. The first message includes the identifier of the first service set.

Based on this solution, the first service instance sends the first message to the first transmission proxy. The first transmission proxy may select the second service instance for the first service instance from the first service set, without participation of the first service instance and/or the second service instance. In this way, the service instance may be decoupled from load balancing, and this helps simplify service logic of the first service instance.

The following provides three manners in which the first service instance obtains the identifier of the first service set.

Manner 1. The first service instance sends capability information of a requested service instance of the first service instance to a transmission proxy corresponding to the first service instance. The first service instance receives, from the transmission proxy corresponding to the first service instance, the identifier of the first service set corresponding to the capability information of the requested service instance.

Manner 2. The first service instance sends capability information of the requested service instance of the first service instance to a transmission proxy corresponding to the first service instance. The first service instance receives, from the second service instance, the identifier of the first service set corresponding to the capability information of the requested service instance.

Manner 3. The first service instance sends capability information of a requested service instance of the first service instance to a network registration network element. The first service instance receives, from a network registration network element, the identifier of the first service set corresponding to the capability information of the requested service instance.

To enable the first service instance to directly send the first message to a transmission proxy corresponding to the first service set, the first service instance receives, from the network registration network element or from the transmission proxy corresponding to the first service instance, an identifier of the transmission proxy corresponding to the first service set.

In a possible implementation, the transmission proxy corresponding to the first service set in the second aspect or any embodiment of the second aspect may also be configured to perform the method performed by the first transmission proxy in the first aspect or any embodiment of the first aspect, and the transmission proxy corresponding to the first service instance in the second aspect or any embodiment of the second aspect may also be configured to perform the method performed by the first transmission proxy in the first aspect or any embodiment of the first aspect. It may also be understood that the transmission proxy corresponding to the first service set in the second aspect or any embodiment of the second aspect may be the first transmission proxy in the first aspect, and the transmission proxy corresponding to the first service instance in the second aspect or any embodiment of the second aspect may also be the first transmission proxy in the first aspect.

According to a third aspect, this application provides a message transmission method. The method includes a third service instance sends a third message to a transmission proxy corresponding to the third service instance. The third message includes capability information of the third service instance and an identifier of the third service instance, and the third message is used to request to register the third service instance with the transmission proxy corresponding to the third service instance. The third service instance receives, from the transmission proxy corresponding to the third service instance, an identifier of a second service set to which the third service instance belongs.

In a possible implementation, the third service instance determines the identifier of the second service set to which the third service instance belongs. The third service instance sends a fourth message to the transmission proxy corresponding to the third service instance. The fourth message includes the identifier of the third service instance, the identifier of the second service set to which the third service instance belongs, and the capability information of the third service instance. The fourth message is used to request to register the third service instance with the transmission proxy corresponding to the third service instance.

In a possible implementation, the third service instance in the third aspect or any embodiment of the third aspect may also be configured to perform the method performed by the first service instance in the first aspect or any embodiment of the first aspect, and the transmission proxy corresponding to the third service instance in the third aspect or any embodiment of the third aspect may also be configured to perform the method performed by the first transmission proxy in the first aspect or any embodiment of the first aspect. It may also be understood that the third service instance in the third aspect or any embodiment of the third aspect may be the first service instance in the first aspect, and the transmission proxy corresponding to the third service instance in the third aspect or any embodiment of the third aspect may also be the first transmission proxy in the first aspect.

According to a fourth aspect, this application provides a message transmission method. The method includes a network registration network element receives a fifth message from a first service instance or a transmission proxy corresponding to a third service instance. The fifth message includes an identifier of a second service set and capability information of the second service set. The network registration network element records a correspondence between the identifier of the second service set and the capability information of the second service set. The second service set includes at least one service instance.

Based on this solution, the network registration network element stores the service set and the capability information of the service set. When the service instance or a first transmission proxy sends capability information of a requested service instance to the network registration network element, the network registration network element may determine, based on the capability information of the to-be-registered service set, a service set corresponding to the capability information of the requested service instance. In this way, a service instance may be not connected to a transmission proxy corresponding to the first service instances, or a service set to which the service instance belongs may be discovered through the network registration network element.

In a possible implementation, the fifth message further includes an identifier of a transmission proxy corresponding to the second service set, so that the network registration network element can obtain, after determining the service set, the identifier of the transmission proxy corresponding to the service set.

In a possible implementation, the fifth message further includes weight information of the transmission proxy corresponding to the second service set, and the weight information of the transmission proxy corresponding to the second service set is used by the network registration network element to select a transmission proxy based on the weight information of the transmission proxy. When the second service set corresponds to a plurality of transmission proxies, different transmission proxies may be selected based on weights. This helps implement load balancing between the transmission proxies.

In a possible implementation, the network registration network element receives a sixth message from the transmission proxy corresponding to the third service instance. The sixth message includes the identifier of the second service set and current capacity information of the second service set. The network registration network element updates the capacity information in the capability information of the second service set based on the current capacity information of the second service set.

In a possible implementation, the network registration network element receives the capability information of the requested service instance from the first service instance or the transmission proxy corresponding to the first service instance. The network registration network element determines a first service set corresponding to the capability information of the requested service instance. The network registration network element sends an identifier of the first service set to the first service instance or the transmission proxy corresponding to the first service instance.

When the network registration network element receives the capability information of the requested service instance from the first service instance, to enable the first service instance to directly send a first message to a transmission proxy corresponding to the first service set, the network registration network element may determine an identifier of the transmission proxy corresponding to the first service set. The network registration network element sends, to the first service instance, the identifier of the transmission proxy corresponding to the first service set.

When the network registration network element receives the capability information of the requested service instance from a first transmission proxy, to enable the first service instance to send, through the first transmission proxy, the first message to the transmission proxy corresponding to the first service set, the network registration network element sends, to the transmission proxy corresponding to the first service instance, the identifier of the first service set and the identifier of the transmission proxy corresponding to the first service set.

In a possible implementation, that the network registration network element determines the identifier of the transmission proxy corresponding to the first service set may be specifically the network registration network element determines, based on an obtained weight of the transmission proxy corresponding to the first service set, the identifier of the transmission proxy corresponding to the first service set.

In a possible implementation, the transmission proxy corresponding to the first service set in the fourth aspect or any embodiment of the fourth aspect may also be configured to perform the method performed by the first transmission proxy in the first aspect or any embodiment of the first aspect, and the transmission proxy corresponding to the first service instance in the fourth aspect or any embodiment of the fourth aspect may also be configured to perform the method performed by the first transmission proxy in the first aspect or any embodiment of the first aspect. It may also be understood that the transmission proxy corresponding to the first service set in the fourth aspect or any embodiment of the fourth aspect may be the first transmission proxy in the first aspect, and the transmission proxy corresponding to the first service instance in the fourth aspect or any embodiment of the fourth aspect may also be the first transmission proxy in the first aspect.

According to a fifth aspect, this application provides an apparatus. The apparatus may be a transmission proxy, a service instance, or a network registration network element. The apparatus includes a processor and a transceiver. Optionally, the apparatus may further include a memory. When the apparatus includes the memory, the memory is configured to store an instruction. The processor is configured to execute the instruction stored in the memory, and control the transceiver to send or receive a signal. When the processor executes the instruction stored in the memory, the apparatus is configured to perform the first aspect or any method in the first aspect, or may be configured to perform the second aspect or any method in the second aspect, or may be configured to perform the third aspect or any method in the third aspect, or may be configured to perform the fourth aspect or any method in the fourth aspect.

According to a sixth aspect, this application provides an apparatus. The apparatus may be a transmission proxy, a service instance, or a network registration network element. The apparatus is configured to implement the first aspect or any method in the first aspect, or is configured to implement the second aspect or any method in the second aspect, or is configured to implement the third aspect or any method in the third aspect, or may be configured to perform the fourth aspect or any method in the fourth aspect. The apparatus includes corresponding functional modules that are respectively configured to implement the steps in the foregoing method. A function may be implemented by using hardware, or may be implemented by using hardware executing corresponding software. The hardware or software includes one or more modules corresponding to the foregoing function. In a possible implementation, a structure of the apparatus includes a processing unit and a transceiver unit. These units may perform corresponding functions in the foregoing method example. For details, refer to detailed descriptions in the method example. Details are not described herein again.

According to a seventh aspect, this application provides a computer storage medium. The computer storage medium stores an instruction, and when the instruction is run on a computer, the computer is enabled to perform the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to an eighth aspect, this application provides a computer program product including an instruction. When the computer program product runs on a computer, the computer is enabled to perform the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to a ninth aspect, this application provides a chip system, including a memory and a processor. The memory is configured to store a computer program, and the processor is configured to invoke the computer program in the memory and run the computer program, so that an apparatus installed with the chip system is enabled to perform the method according to any one of the first aspect to the fourth aspect or the possible implementations of the first aspect to the fourth aspect.

According to a tenth aspect, an embodiment of this application provides a communications system. The system includes one or more of a first transmission proxy, a first service instance, a second service instance, a third service instance, and a network registration network element.

The first transmission proxy may be configured to perform the method according to any one of the first aspect or the possible designs of the first aspect, or the method performed by the service instance in the solutions provided in this application. The first service instance, the second service instance, or the third service instance may perform the method according to any one of the second aspect or the possible designs of the second aspect, the method according to any one of the third aspect or the possible designs of the third aspect, or the method performed by the service instance in the solutions provided in the embodiments of this application. The network registration network element may be configured to perform the method according to any one of the fourth aspect or the possible designs of the fourth aspect, or the method performed by the network registration network element in the solutions provided in this application.

DESCRIPTION OF EMBODIMENTS

It should be understood that the terms "first", "second", and the like in the embodiments, the claims, and the accompanying drawings of this application are intended to distinguish between similar objects but do not necessarily indicate a specific order or sequence.

In this application, "at least one" means one or more, and "plurality" means two or more. The term "and/or" is used to describe an association relationship between associated objects, and indicates that three relationships may exist. For example, "A and/or B" may represent the following three cases only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be one or more than one.

Figure 1:
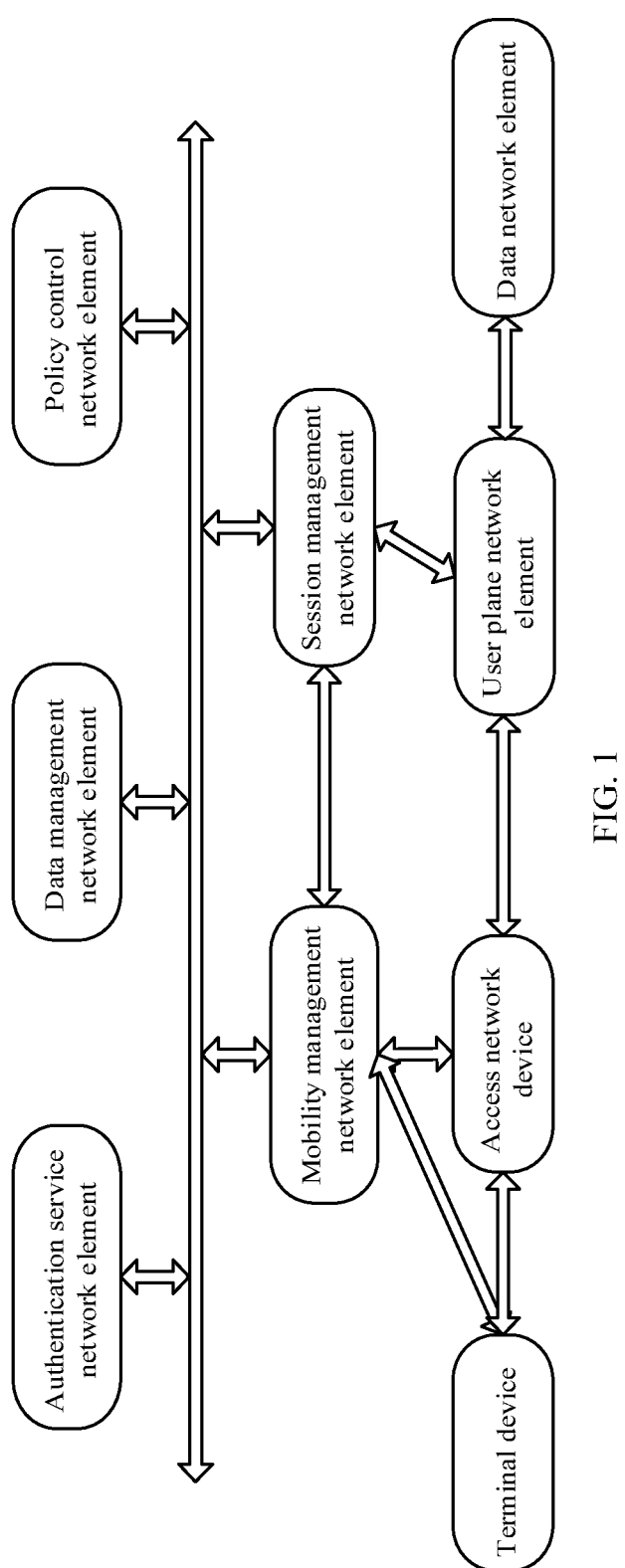
FIG. 1 is a schematic diagram of a communications system architecture according to an embodiment of this application.

FIG. 1 is an example schematic diagram of a communications system architecture according to this application. As shown in FIG. 1, the communications system architecture includes a mobility management network element, a session management network element, a policy control network element, an authentication service network element, a data management network element, and a user plane network element. Further, the communications system architecture further includes an access network device, a terminal device (or user equipment (UE)), and a data network (DN) element.

The terminal device may be connected to the mobility management network element. The access network device may also be connected to the mobility management network element. The access network device may further be connected to the user plane network element. The user plane network element may be connected to each of the session management network element and the DN. The mobility management network element may be connected to each of the session management network element, the data management network element, the policy control network element, and the authentication service network element. The session management network element is connected to each of the policy control network element and the data management network element. The mobility management network element and the session management network element each may obtain data, for example, user subscription data, from the data management network element, and each may obtain policy data from the policy control network element. For example, the policy control network element obtains the user subscription data from the data management network element and sends the user subscription data to the mobility management network element and the session management network element. Then, the mobility management network element and the session management network element deliver the user subscription data to the access network device, the terminal device, the user plane network element, and the like.

The mobility management network element is mainly used for registration, mobility management, and a tracking area update procedure for a terminal device in a mobile network. The mobility management network element terminates a non-access stratum (NAS) message, completes registration management, connection management, reachability management, tracking area (TA) list allocation, mobility management, and the like, and transparently routes a session management (SM) message to the session management network element. In 5th generation (5G) communication, the mobility management network element may be an access and mobility management function (AMF) network element in core network. In future communication, for example, 6th generation (6G) communication, the mobility management network element may still be an AMF network element or have another name. This is not limited in this application.

The session management network element is mainly configured to manage a session in the mobile network, for example, create, modify, or release a session. Specific functions include, for example, assigning an Internet Protocol (IP) address to a user, and selecting a user plane network element that provides a packet forwarding function. In 5G, the session management network element may be a session management function (SMF) network element. In future communication, for example, 6G, the session management network element may still be an SMF network element or have another name. This is not limited in this application.

The policy control network element has a user subscription data management function, a policy control function, a charging policy control function, quality of service (QoS) control, and the like. In 5G, the policy control network element may be a policy control function (PCF) network element. In future communication, for example, 6G, the policy control network element may still be a PCF network element or have another name. This is not limited in this application.

The authentication server network element is mainly configured to verify a service function according to an extensible authentication protocol (EAP), and store a key, so as to implement authentication and authorization on a user.

In 5G, the authentication server network element may be an authentication server function (AUSF) network element. In future communication, for example, 6G, the user plane network element may still be an AUSF network element or have another name. This is not limited in this application.

The data management network element is mainly configured to store user data, such as subscription information and authentication/authorization information. In 5G, the data management network element may be a unified data management (UDM) network element. In future communication, for example, 6G, the data management network element may still be a UDM network element or have another name. This is not limited in this application.

The user plane network element is mainly used for user-plane service processing, for example, service routing, packet forwarding, an anchoring function, QoS mapping and execution, identification of an uplink identifier and routing of the identifier to a DN, downlink packet buffering, trigger of notifying downlink data arrival, and connection to an external DN. In 5G, the user plane network element may be a user plane function (UPF) network element. In future communication, for example, 6G, the user plane network element may still be a UPF network element or have another name. This is not limited in this application.

The access network device may also be referred to as a radio access network (RAN) device, and is a device that provides a wireless communication function for a terminal device. The access network device includes but is not limited to a next generation base station (gNB) in 5G, an evolved NodeB (eNB), a radio network controller (RNC), a NodeB (NB), a base station controller (BSC), a base transceiver station (BTS), a home base station (for example, a home eNB, or a home NB (HNB)), a baseband unit (BBU), a transmission reception point (TRP), a transmission point (TP), a mobile switching center, and the like.

The terminal device (or UE) is a device having a wireless transceiver function. The terminal device may be deployed on land, including an indoor device, an outdoor device, a handheld device, or a vehicle-mounted device, or may be deployed on a water surface (for example, on a ship), or may be deployed in the air (for example, on a plane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The DN is mainly used to provide a service for a user, for example, a service of an operator, an internet access service, or a third-party service.

It may be understood that the foregoing network element or function may be a network element in a hardware device, a software function running on dedicated hardware, or a virtualization function instantiated on a platform (for example, a cloud platform). One or more services may be obtained through division based on the foregoing functions. Further, a service independent of a network function may exist. In this application, an instance of the foregoing function, an instance of a service included in the foregoing function, or a service instance independent of the network function may be referred to as a service instance.

Figure 2:
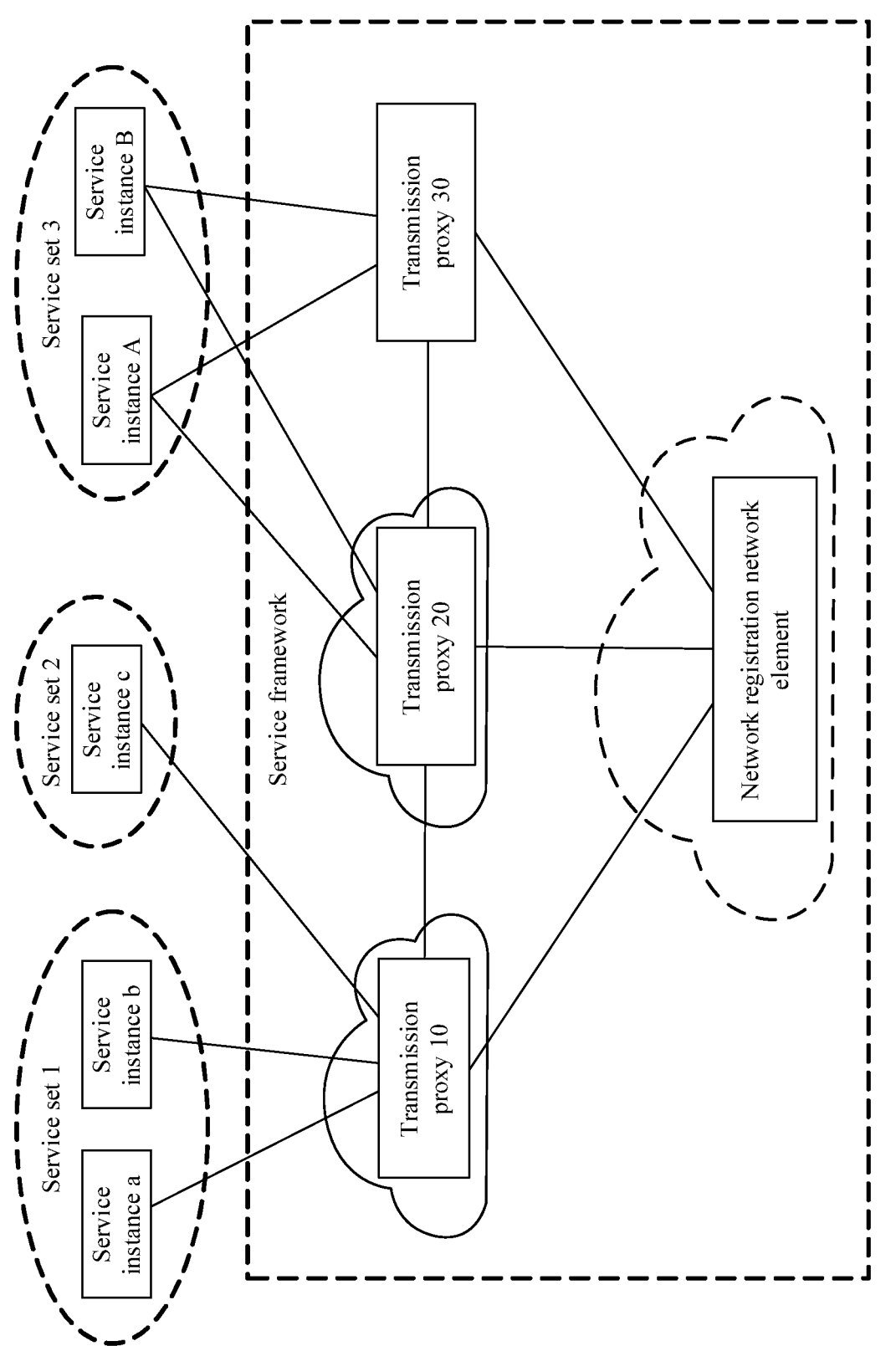
FIG. 2 is a schematic diagram of another communications system architecture according to an embodiment of this application.

Based on the communications system architecture in FIG. 1, when a message needs to be transmitted between the mobility management network element, the session management network element, the policy control network element, the authentication service network element, the data management network element, and the user plane network element, a network element to which the message is to be sent may be determined by a transmission proxy. For example, when the mobility management network element needs the session management network element to provide a service for the mobility management network element, the mobility management network element may first send a message to the transmission proxy. The transmission proxy determines the session management network element based on the received message, and then sends the message to the session management network element. FIG. 2 is a schematic diagram of another communications system architecture according to this application. A description is provided by using an example in which the communications system in FIG. 2 includes a transmission proxy 10, a transmission proxy 20, a transmission proxy 30, a network registration network element, a service instance a, a service instance b, a service instance c, a service instance A, and a service instance B. There is an interface between the transmission proxy 10 and each of the service instance a, the service instance b, and the service instance c. There is an interface between the transmission proxy 20 and each of the service instance A and the service instance B. There is also an interface between the transmission proxy 30 and each of the service instance A and the service instance B. It may also be understood that each of the service instance a, the service instance b, and the service instance c is connectable to the transmission proxy 10, both the service instance A and the service instance B are connectable to the transmission proxy 20, and both the service instance A and the service instance B are connectable to the transmission proxy 30. There is an interface between the network registration network element and each of the transmission proxy 10, the transmission proxy 20, and the transmission proxy 30, and there are interfaces between the transmission proxy 10, the transmission proxy 20, and the transmission proxy 30.

The service instance (including the service instance a, the service instance b, the service instance c, the service instance A, or the service instance B in FIG. 2) may be any one of the mobility management network element, the session management network element, the policy control network element, the authentication service network element, the data management network element, or the user plane network element in FIG. 1. Capability information of the service instance a and capability information of the service instance b are the same, and both the service instance a and the service instance b belong to a service set 1. Capability information corresponding to the service set 1 is the same as the capability information of the service instance a, and is also the same as the capability information of the service instance b. Capability information may also be referred to as function information. To be specific, service instances may be classified into service sets based on functions, and a service set can provide a service provided by a service instance in the service set. For example, when both the service instance a and the service instance b are AMFs, the service set 1 is an AMF service set, and the service set 1 can provide a service (or referred to as a function) that can be provided by the AMF. The capability information includes but is not limited to a capability of a supported network slice, a serving area, and a service type. For a different service type, the capability information may further include other information associated with the service type, for example, a DN name (DNN). The service instance c belongs to a service set 2, and capability information of the service set 2 is the same as capability information of the service instance c. Capability information of the service instance A and capability information of the service instance B are the same, and both the service instance A and the service instance B belong to a service set 3. Capability information corresponding to the service set 3 is the same as the capability information of the service instance A, and is the same as the capability information of the service instance B. In a possible implementation, the service instance a and the service instance b may be a backup of each other, and/or the service instance A and the service instance B are also a backup of each other. The capability information of the service set 1, the capability information of the service set 2, and the capability information of the service set 3 may be the same or different. For ease of distinguishing between service sets, each service set may have a unique service set identifier.

The transmission proxy (including the transmission proxy 10, the transmission proxy 20, or the transmission proxy 30 in FIG. 2) is configured to process, for example, forward, register, or discover a received message from the service instance. The transmission proxy locally stores information about a service set, for example, an identifier of the service set and capability information of the service set. As shown in FIG. 2, the transmission proxy 10 corresponds to each of the service set 1 and the service set 2. In other words, information about the service set 1 and information about the service set 2 are locally stored on the transmission proxy 10. The transmission proxy 20 and the transmission proxy 30 correspond to the service set 3. In other words, information about the service set 3 may be locally stored on both the transmission proxy 20 and the transmission proxy 30. The transmission proxy may further store information about a service instance that is in a local service set and that is connected to the transmission proxy. For example, if both the service instance a and the service instance b in the service set 1 are connected to the transmission proxy 10, the transmission proxy 10 stores the information about the service set 1 and the information about the service set 2, where the service set 1 includes the service instance a and the service instance b, and the service set 2 includes the service instance c. The transmission proxy 20 may locally store the information about the service set 3, where the service set 3 includes the service instance A and the service instance B. The transmission proxy 30 may locally store the information about the service set 3, where the service set 3 includes the service instance A and the service instance B. There is an interface between the transmission proxy and the service instance in the service set corresponding to the information that is locally stored on the transmission proxy and that is about the service set, and the transmission proxy may be connected to the service instance. As shown in FIG. 2, there is an interface between the transmission proxy 10 and each of the service instance a and the service instance b in the service set 1. There is also an interface between the transmission proxy 10 and the service instance c in the service set 2. There is an interface between the transmission proxy 20 and each of the service instance A and the service instance B in the corresponding service set 3. There is an interface between the transmission proxy 30 and each of the service instance A and the service instance B in the corresponding service set 3. The transmission proxy 10 may be responsible for load balancing of the service instance a and the service instance b. The transmission proxy 20 and the transmission proxy 30 each may be responsible for load balancing of the service instance A and the service instance B.

In a possible implementation, one service set may be served by a plurality of transmission proxies. For example, the service set 3 is served by the transmission proxy 20 and the transmission proxy 30. A plurality of transmission proxies may provide a service for a cross-data-center service set, to implement remote redundancy of the service set. For example, the service instance A and the transmission proxy 20 are in one data center, and the service instance B and the transmission proxy 30 are in another data center. In this case, when one data center is faulty, the service instance B in another data center can still provide a service, thereby implementing relatively good redundancy. It should be noted that, when the transmission proxy 20 and the service instance B do not belong to a same data center, information about the service instance B stored on the transmission proxy 20 is optional, and when the transmission proxy 30 and the service instance A do not belong to a same data center, information about the service instance A stored on the transmission proxy 30 is also optional. This is not limited in this application.

In a possible implementation, the transmission proxy includes a transmission function, a service registration function, and a service discovery function. These functions may be integrated together, for example, deployed on a same virtual machine, deployed on a same container, or deployed on a same physical host. Alternatively, these functions may be separately integrated, for example, deployed on different virtual machines, deployed on different containers, or deployed on different physical hosts. It may also be understood that these functions in the transmission proxy may be different function entities, that is, implemented by different network elements. The transmission function corresponds to one network element, the service registration function corresponds to one network element, and the service discovery function corresponds to one network element. These network elements may respectively implement the corresponding functions of the transmission proxy, and may jointly implement all the functions of the transmission proxy. An implementation form of these functions is not limited in this application. If these functions are deployed on different function entities, the transmission proxy in this application corresponds to a set of these function entities. Optionally, the transmission proxy may alternatively be a cluster, and load sharing or backup may be implemented between hosts, or containers, or virtual machines in the cluster.

The transmission proxy and the service instance may be deployed in a distributed manner on an operator's network. For example, in China, both the transmission proxy and the service instance may be deployed at a central office of 4th generation (4G) communication, or a central office of 5G communication, or at a central office of future communication, for example, 6G. The transmission proxy and the service instance may alternatively be deployed in a large city, or deployed at a lower location, for example, in a metropolitan area network, or deployed at a higher location, for example, a region. In a possible implementation, the transmission proxy and the service instance connected to the transmission proxy may be deployed in one data center. For example, in FIG. 2, the transmission proxy 10, the service instance a, the service instance b, and the service instance c are deployed in one data center, and the transmission proxy 20, the service instance A, and the service instance B are deployed in another data center. In another possible implementation, the transmission proxy and the service instance connected to the transmission proxy may alternatively be deployed in different data centers. For example, in FIG. 2, the transmission proxy 20 and the service instance A are deployed in one data center, and the service instance B is deployed in another data center. In this case, the transmission proxy 20 may be connected to the service instance B.

The network registration network element is mainly configured to support registration and status monitoring of a network function service, to implement automatic management, selection, and extension of the network function service. In 5G communication, the network registration network element may be a network registration and discovery function (or a Network Repository Function (NRF)) network element. In future communication, for example, 6G communication, the network registration network element may still be an NRF network element or have another name. This is not limited in this application. The network registration network element may be connected to each of the transmission proxy 10, the transmission proxy 20, and the transmission proxy 30, so that the transmission proxy can register with the network registration network element. In this application, the network registration network element further supports registration and status monitoring of a service set. In a possible implementation, a combination of the network registration network element and the transmission proxy is also referred to as a service framework.

Figure 3:
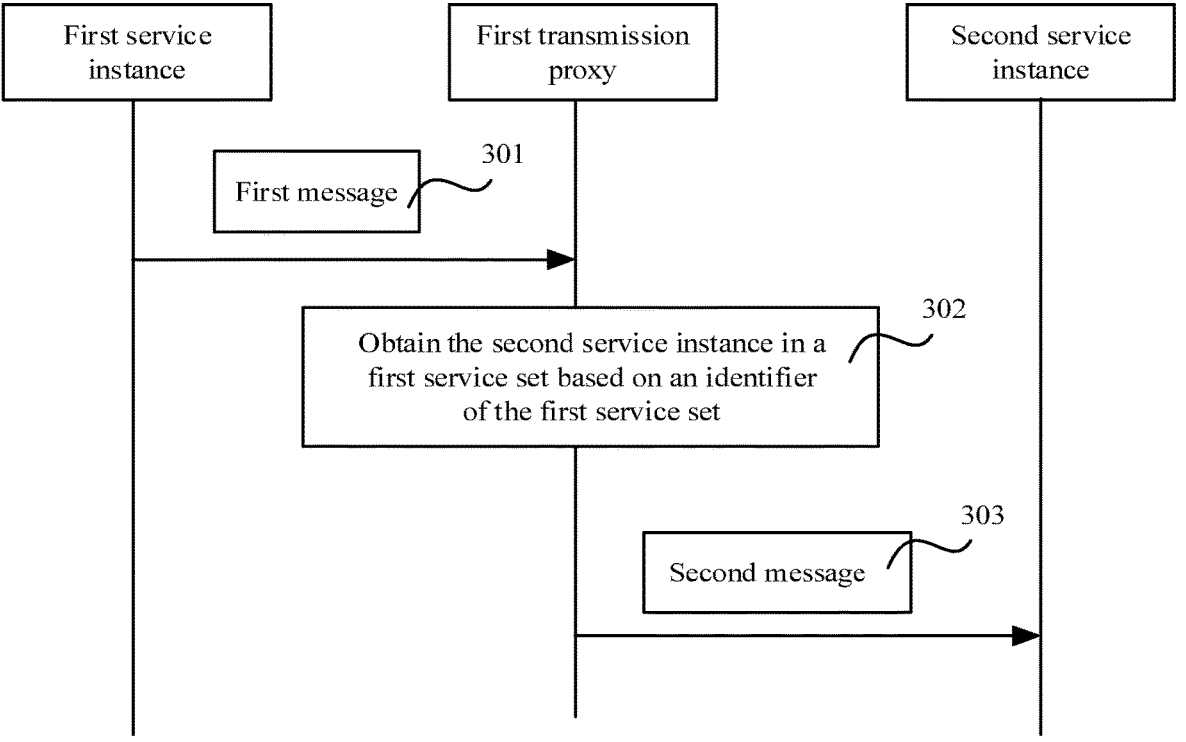
FIG. 3 is a schematic flowchart of a message transmission method according to an embodiment of this application.

Based on the foregoing content, FIG. 3 is an example schematic flowchart of a message transmission method according to this application. A first service instance may be any one of the mobility management network element, the session management network element, the policy control network element, the authentication service network element, the data management network element, or the user plane network element in FIG. 1. Alternatively, the first service instance may be any one of the service instance a, the service instance b, the service instance c, the service instance A, or the service instance B in FIG. 2. A second service instance is different from the first instance, and may be any one of the mobility management network element, the session management network element, the policy control network element, the authentication service network element, the data management network element, or the user plane network element in FIG. 1. Alternatively, the second service instance may be any service instance in any service set other than a service set to which the first service instance belongs in FIG. 2. A first transmission proxy may be any one of the transmission proxy 10, the transmission proxy 20, or the transmission proxy 30 in FIG. 2. As shown in FIG. 3, the method includes the following steps.

Step 301. The first transmission proxy receives a first message from the first service instance.

The first message includes an identifier of a first service set.

In a possible implementation, the first message is used to request a second service, where the second service is a to-be-provided service. For example, when the first service instance is an AMF network element, and the second service instance is an SMF network element, the first message may be a session creation request message, a session modification request message, or a session release request message.

In a possible implementation, the first message may be a HTTP message. The HTTP message includes a message header, and the message header includes the identifier of the first service set. Because a service logical interface defined in R15 is based on the HTTP protocol, the message header in the HTTP message defined in R15 includes a destination address. In this way, when the first message is the HTTP message, the first message may be compatible with R15. In a possible implementation, an identifier of a service set may be a fully qualified domain name (FQDN), or may be another identifier, for example, a number, a letter, or a combination of a number and a letter. When the identifier of the first service set is an FQDN, the first service instance may directly set the FQDN corresponding to the first service set to a host name (namely, Authority) of the HTTP message. If the identifier of the first service set is not an FQDN, the first service instance may generate an FQDN based on the identifier of the first service set. For example, the identifier of the first service set is a number. The first service instance may generate, based on the identifier of the first service set, an FQDN corresponding to the first service set. Optionally, FQDN=Set ID<Set ID>.Service Type<Service Type>. suffix, where Set ID represents the identifier of the service set, Service Type represents a service type, and the suffix may include location information (for example, a domain name of a data center in which a service instance is deployed).

Optionally, the first message may be a message in another format, for example, an Advanced Message Queuing Protocol (AMQP) message. This is not limited in this application.

Step 302. The first transmission proxy obtains a second service instance in the first service set based on the identifier of the first service set.

In an optional implementation, the first transmission proxy determines, based on the identifier of the first service set, the first service set from at least one service set corresponding to the information that is locally stored on the first transmission proxy and that is about the service set, and the first transmission proxy may select the second service instance from the first service set according to a load balancing policy. In this implementation, the first transmission proxy is connected to at least one service instance in the first service set, and the first transmission proxy locally stores information about the first service set.

If the first message received by the first transmission proxy is the HTTP message, the first transmission proxy may determine, based on the host name of the HTTP message, whether the first service set in the first message is one of the at least one service set corresponding to the information that is locally stored on the first transmission proxy and that is about the service set. If the host name is in a (Set ID<Set ID>.Service Type<Service Type>. suffix) format, whether the first service set is one of the at least one service set corresponding to the information that is locally stored on the first transmission proxy and that is about the service set may be determined based on the identifier Set ID of the service set.

Step 303. The first transmission proxy sends a second message to the second service instance based on the first message.

The second message may be the same as or different from the first message. It may also be understood that the first transmission proxy may forward the first message to the second service instance. Alternatively, the first transmission proxy may add content to the first message or delete some content from the first message, to form the second message, and send the second message to the second service instance. For example, the first message may be a session modification request message, and the second message may also be a session modification request message. In a possible implementation, a difference between the first message and the second message lies in that, the first message does not include an identifier of the first transmission proxy, and the second message may carry the identifier of the first transmission proxy.

In this application, it can be learned from step 301 to step 303 that, the first transmission proxy may select the second service instance for the first service instance from the first service set, without participation of the first service instance and the second service instance. In this way, the service instance may be decoupled from load balancing, and this helps simplify service logic of the service instance.

Further, both sending of the first message to the first transmission proxy by the first service instance and sending of the second message to the second service instance by the first transmission proxy may be implemented through a service-oriented interface that is better compatible with R15 and that is defined in R15, and an existing interface does not need to be modified. In addition, the first transmission proxy may select the second service instance based on the identifier of the first service set. In other words, routing information for sending the second message to the second service instance is simple. This helps improve scalability of the first transmission proxy.

With reference to FIG. 2, the message transmission method in FIG. 3 is described for different scenarios. The first transmission proxy may be connected to the first service instance, and also connected to the second service instance. Alternatively, the first transmission proxy may not be connected to the first service instance, but is connected to the second service instance. Alternatively, the first transmission proxy may be connected to the first service instance, but is not connected to the second service instance.

Scenario 1. The first transmission proxy is connected to the first service instance, and is also connected to the second service instance. It may also be understood that the first service instance is connected to the first transmission proxy, and the first transmission proxy locally stores the identifier of the first service set. With reference to FIG. 2, the first transmission proxy may be the transmission proxy 10 in FIG. 2, the first service instance may be either of the service instance a and the service instance b in the service set 1, the first service set is the service set 2, and the second service instance is the service instance c in the service set 2. Alternatively, the first service instance is the service instance c in the service set 2, the first service set is the service set 1, and the second service instance may be either of the service instance a and the service instance b in the service set 1.

In scenario 1, a possible implementation of step 301 is as follows. The first service instance sends the first message to the first transmission proxy, and the first transmission proxy receives the first message sent by the first service instance. To support the first service instance in sending the first message to the first transmission proxy, an IP address corresponding to the identifier of the first service set may be configured, on a domain name server (DNS), to an IP address of the first transmission proxy. The first service instance sends, to the DNS, a domain name resolution request carrying an FQDN of the first service instance. Then, the DNS sends the IP address of the first transmission proxy to the first service instance. In this way, the first service instance can send the first message to the first transmission proxy. Alternatively, before sending the first message, the first service instance first obtains an identifier of a service set to which a requested service instance belongs. In a process of obtaining the identifier of the service set to which the requested service instance belongs (also referred to as a service discovery process), the first service instance receives the identifier of the first service set and the identifier of the corresponding first transmission proxy, and the first service instance may obtain the IP address of the first transmission proxy based on the identifier of the first transmission proxy. In a possible implementation of step 302, the first transmission proxy determines the first service set from the at least one service set corresponding to the information that is locally stored on the first transmission proxy and that is about the service set, and selects the second service instance from the first service set.

Scenario 2. The first transmission proxy is not connected to the first service instance, but is connected to the second service instance. It may also be understood that the first transmission proxy is not connected to the first service instance, and the first transmission proxy locally stores the identifier of the first service set. With reference to FIG. 2, if the first transmission proxy is the transmission proxy 10 in FIG. 2, and a transmission proxy connected to the first service instance is the transmission proxy 20 (or the transmission proxy 30) in FIG. 2, the first service instance may be either of the service instance A and the service instance B in the service set 3. The first service set may be the service set 1, and the second service instance may be the service instance a or the service instance b in the service set 1. Alternatively, the first service set may be the service set 2, and the second service instance may be the service instance c in the service set 2. If the first transmission proxy is the transmission proxy 20 (or the transmission proxy 30) in FIG. 2, and a transmission proxy connected to the first service instance is the transmission proxy 10 in FIG. 2, the first service instance may be either of the service instance a and the service instance b in the service set 1. Alternatively, the first service instance may be the service instance c in the service set 2, the first service set may be the service set 3 in FIG. 2, and the second service instance may be either of the service instance A and the service instance B in the service set 3.

In scenario 2, step 301 includes the following two implementations.

Implementation 1. The first service instance sends the first message to the transmission proxy connected to the first service instance. The transmission proxy connected to the first service instance determines, based on the identifier that is of the first service set and that is included in the first message, the first transmission proxy corresponding to the first service set, and sends the first message to the first transmission proxy. In a possible implementation, all first messages sent by the first service instance are forwarded by the transmission proxy connected to the first service instance. Specifically, the first service proxy may set, to an HTTP transmission proxy, the transmission proxy connected to the first service instance. After receiving the first message, the HTTP transmission proxy may determine whether the identifier that is of the first service set and that is included in the first message is locally stored on the HTTP transmission proxy. If the identifier that is of the first service set and that is included in the first message is locally stored on the HTTP transmission proxy, the HTTP transmission proxy selects the second service instance from the first service set. If the identifier that is of the first service set and that is included in the first message is not locally stored on the HTTP transmission proxy, the HTTP transmission proxy forwards the first message to the first transmission proxy. During specific implementation, to support the HTTP transmission proxy in sending the first message to the first transmission proxy, an IP address corresponding to the identifier of the first service set may be configured, on a DNS, to an IP address of the first transmission proxy. The HTTP transmission proxy sends, to the DNS, a domain name resolution request carrying the identifier of the first service set. Then, the DNS returns the IP address of the first transmission proxy to the HTTP transmission proxy. In this way, the HTTP transmission proxy can send the first message to the first transmission proxy. Alternatively, before sending the first message, the HTTP transmission proxy first obtains an identifier of a service set to which a requested service instance belongs. In a process of obtaining the identifier of the service set to which the requested service instance belongs, the HTTP transmission proxy receives the identifier of the first service set and the identifier of the corresponding first transmission proxy, and the HTTP transmission proxy may obtain the IP address of the first transmission proxy based on the identifier of the first transmission proxy.

Implementation 2. The first service instance may directly send the first message to the first transmission proxy without forwarding by the transmission proxy connected to the first service instance. For a specific implementation, refer to step 301 in scenario 1.

An implementation of step 302 in scenario 2 may be the same as the implementation of step 302 in scenario 1, and details are not described herein again.

Scenario 3. The first transmission proxy is connected to the first service instance, but is not connected to the second service instance. It may also be understood that the first transmission proxy is connected to the first service instance, and the first transmission proxy does not locally store the identifier of the first service set. With reference to FIG. 2, the first transmission proxy may be the transmission proxy 10 in FIG. 2. The first service instance may be either of the service instance a and the service instance b in the service set 1. Alternatively, the first service instance may be the service instance c in the service set 2. The first service set is the service set 3 in FIG. 2, and the second service instance may be either of the service instance A and the service instance B in the service set 3. Alternatively, the first transmission proxy is the transmission proxy 20 (or the transmission proxy 30) in FIG. 2. The first service instance may be either of the service instance A and the service instance B in the service set 3. The first service set is the service set 1, and the second service instance may be either of the service instance a and the service instance b in the service set 1. Alternatively, the first service set is the service set 2, and the second service instance is the service instance c in the service set 2.

An implementation of step 301 in scenario 3 may be the same as the implementation 1 or implementation 2 of step 301 in scenario 2, and details are not described herein again. A possible implementation of step 302 and step 303 is as follows. The first transmission proxy determines, based on the identifier of the first service set, a transmission proxy corresponding to the identifier of the first service set. The first transmission proxy obtains, from the transmission proxy corresponding to the identifier of the first service set, the identifier of the second service instance in the first service set. The first transmission proxy sends the second message to the second service instance based on the first message.

Figure 4A:
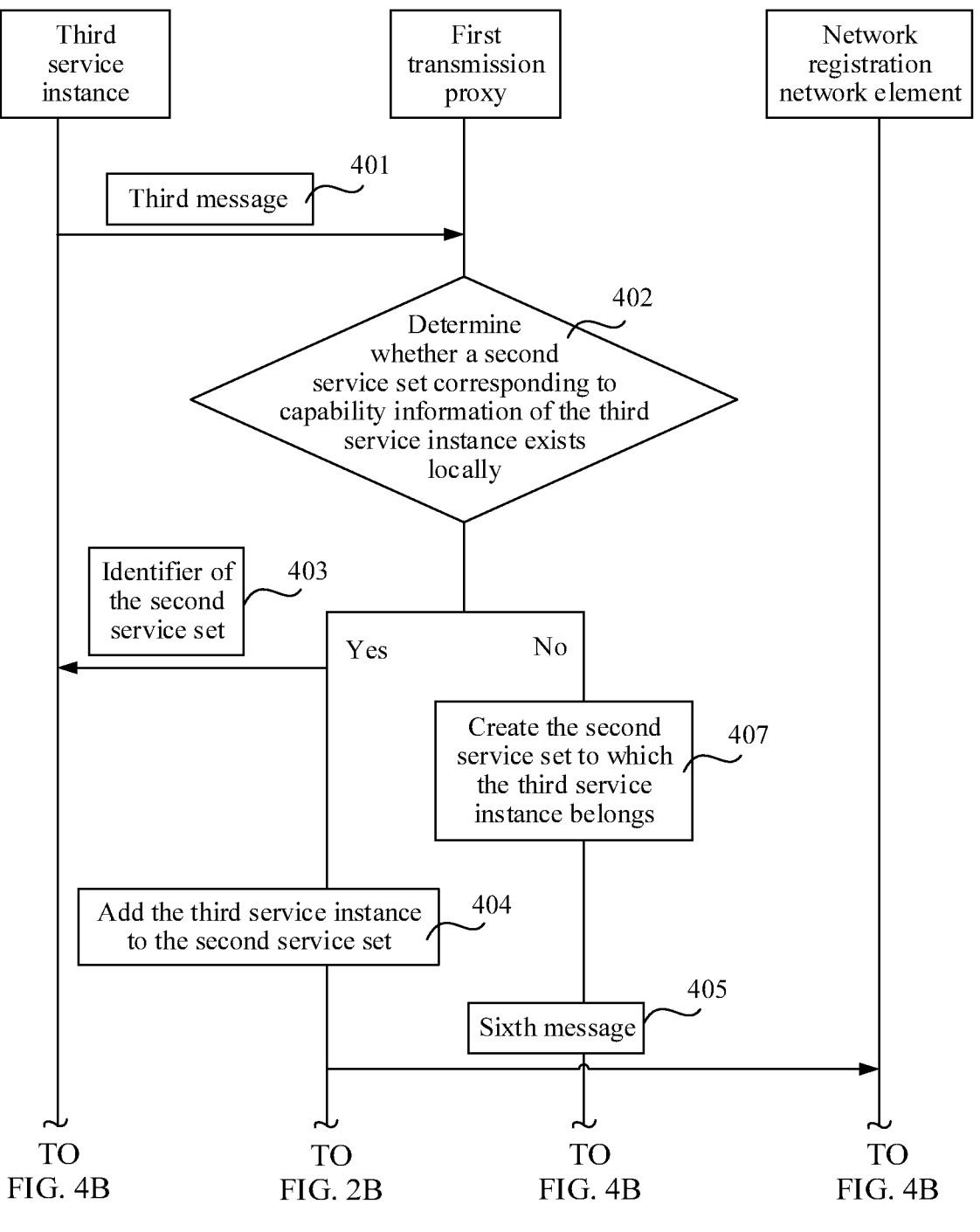
FIG. 4A and FIG. 4B are a schematic flowchart of a service instance registration method according to an embodiment of this application.
Figure 4B:
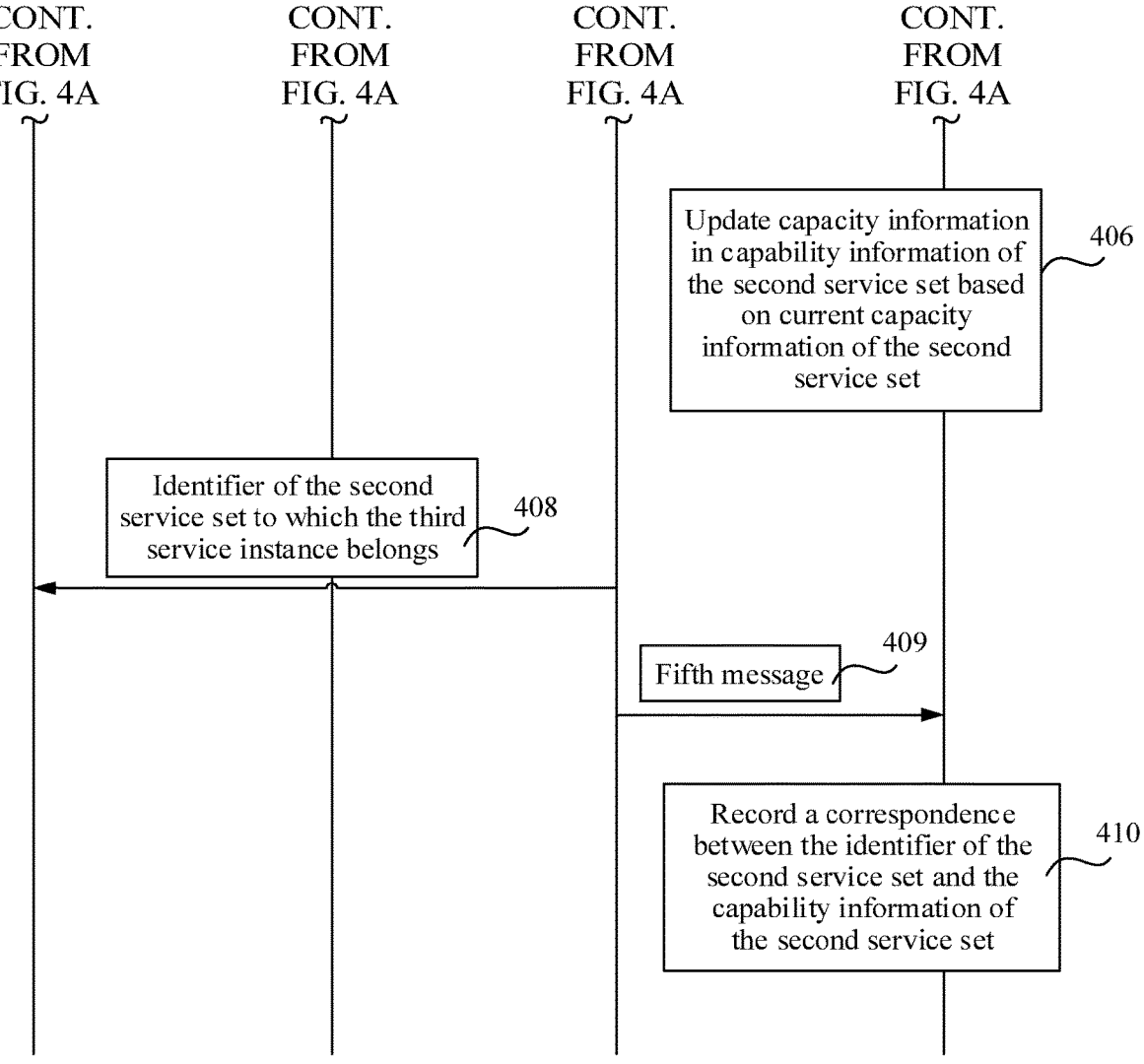

When a service instance provides a service, the service instance may be automatically registered with a transmission proxy, and then the transmission proxy registers, with a network registration network element, a service set to which the service instance that provides a service belongs. This helps simplify configuration of the service instance that provides a service. FIG. 4A and FIG. 4B are an example schematic flowchart of a service instance registration method according to this application. A service instance may be registered with a transmission proxy connected to the service instance. For ease of description of the solution, FIG. 4A and FIG. 4B are described by using an example in which a transmission proxy connected to a third service instance is a first transmission proxy, in other words, the third service instance is registered with the first transmission proxy. The third service instance may be any one of the mobility management network element, the session management network element, the policy control network element, the authentication service network element, the data management network element, or the user plane network element in FIG. 1, or may be any one of the service instances in FIG. 2. The first transmission proxy may be any one of the transmission proxy 10, the transmission proxy 20, or the transmission proxy 30 in FIG. 2. If the first transmission proxy is the transmission proxy 10 in FIG. 2, the third service instance may be any one of the service instance a, the service instance b, or the service instance c. If the first transmission proxy is the transmission proxy 20 (or the transmission proxy 30) in FIG. 2, the third service instance may be either of the service instance A and the service instance B. In the foregoing scenario 1, the third service instance may be a first service instance or a second service instance. In the foregoing scenario 2, the third service instance may be a second service instance. In the foregoing scenario 3, the third service instance may be a first service instance. A process, shown in FIG. 4A and FIG. 4B, in which the third service instance is registered with the first transmission proxy is used in registration of any service instance with a transmission proxy connected to the service instance. As shown in FIG. 4A and FIG. 4B, the method includes the following steps.

Step 401. The third service instance sends a third message to the first transmission proxy.

The third message includes capability information of the third service instance and an identifier of the third service instance, and the third message is used to request to register the third service instance with the first transmission proxy. The capability information of the third service instance includes at least one of the following a service type, a serving area, a capability of a supported network slice, a capacity, or a DNN.

In a possible implementation, the third message may further include manufacturer information of the third service instance.

In this application, after receiving the third message from the third service instance, the first transmission proxy obtains, based on the third message, a second service set corresponding to the capability information of the third service instance, and sends an identifier of the second service set to the third service instance. A specific process is as follows.

Step 402. The first transmission proxy determines whether the second service set corresponding to the capability information of the third service instance exists on the first transmission proxy. If the second service set exists on the first transmission proxy, step 403 to step 405 are performed. If the second service set does not exist on the first transmission proxy, step 407 to step 409 are performed.

Optionally, when the third message further includes the manufacturer information of the third service instance, the first transmission proxy may determine, based on the capability information and the manufacturer information of the third service instance, whether the corresponding second service set exists on the first transmission proxy. For example, when the third service instance that provides a service is an AMF, the capability information of the third service instance AMF includes a capability of a supported network slice is A, a serving area is B, and a manufacturer is Huawei. In service sets corresponding to the first transmission proxy, a service type of the second service set is an AMF, a capability of a supported network slice is A, a serving area is B, and a manufacturer is also Huawei. In this case, the first transmission proxy may determine that the second service set corresponding to the capability information of the third service instance exists.

Step 403. The first transmission proxy sends an identifier of the second service set to the third service instance.

In a possible implementation, the first transmission proxy may further send, to the third service instance, an address of a shared data layer corresponding to the second service set.

Correspondingly, the third service instance receives the identifier, sent by the first transmission proxy, of the second service set.

Step 404. The first transmission proxy adds the third service instance to the second service set.

Optionally, the first transmission proxy modifies capacity information of the second service set. In a possible implementation, the capacity information of the second service set is equal to a sum of capacity information of all service instances in the second service set.

Step 405. The first transmission proxy sends a sixth message to a network registration network element.

The sixth message includes the identifier of the second service set and current capacity information of the second service set.

Correspondingly, the network registration network element receives the sixth message from the first transmission proxy.

Step 406. The network registration network element updates the capacity information of the second service set based on the current capacity information of the second service set.

Step 403, step 404, and step 405 are not sequential. Any one of step 403, step 404, or step 405 may be performed first. Alternatively, step 403, step 404, and step 405 may be performed at the same time. This is not limited in this application. Step 403 and step 406 are optional steps.

Step 407. The first transmission proxy creates the second service set to which the third service instance belongs.

The second service set to which the third service instance belongs corresponds to the capability information of the third service instance. In other words, capability information of the second service set to which the third service instance belongs is the same as the capability information of the third service instance. For example, the third service instance is an SMF, and the capability information of the third service instance includes a capability of the supported network slice is M, a serving area is N, and a supported DNN is Q. In this case, the created second service set to which the third service instance belongs is an SMF service set, and capability information of the SMF service set includes a capability of the supported network slice is M, a serving area is N, and a supported DNN is Q.

Optionally, when the third message further includes the manufacturer information of the third service instance, the second service set also includes the same manufacturer information. For example, if the manufacturer information of the third service instance is Huawei, a manufacturer corresponding to the second service set is also Huawei.

In a possible implementation, a specific process in which the first transmission proxy creates the second service set to which the third service instance belongs may be as follows. The first transmission proxy allocates the identifier of the second service set to which the third service instance belongs, and creates a correspondence between the second service set to which the third service instance belongs and the capability information of the third service instance. The created second service set to which the third service instance belongs includes the third service instance, and a capability of the created second service set is the same as a capability of the third service instance. According to this solution, a service set can be automatically created, thereby further simplifying network configuration.

Optionally, the first transmission proxy may allocate a shared data layer, for example, a database, to the created second service set to which the third service instance belongs.

Step 408. The first transmission proxy sends, to the third service instance, the identifier of the second service set to which the third service instance belongs.

Correspondingly, the third service instance receives the identifier of the second service set from the first transmission proxy.

In an optional implementation, the first transmission proxy further sends an address of the allocated shared data layer to the third service instance.

Step 409. The first transmission proxy sends a fifth message to the network registration network element.

Correspondingly, the network registration network element receives the fifth message from the first transmission proxy.

The fifth message includes the identifier of the second service set to which the third service instance belongs and the capability information of the third service instance corresponding to the second service set. That the second service set corresponds to the capability information of the third service instance may also be understood as follows. The capability information of the second service set is the capability information of the third service instance. The fifth message is used to request to register the second service set with the network registration network element. In this way, a service instance not connected to the first transmission proxy can discover, through the network registration network element, the second service set to which the third service instance belongs.

In a possible implementation, the capability information in the fifth message includes at least one of the following a service type, a serving area, an identifier of a supported network slice, and a DNN that are supported by the second service set to which the third service instance belongs. "At least one" may also be understood as one or more, and "plurality" means two or more.

In a possible implementation, the fifth message further includes the manufacturer information of the second service set.

In a possible implementation, the fifth message further includes an identifier of a transmission proxy corresponding to the second service set. For example, when the second service set is the service set 3 in FIG. 2, the identifier of the corresponding transmission proxy is at least one of an identifier of the transmission proxy 20 and an identifier of the transmission proxy 30. When the second service set is the service set 1 in FIG. 2, the identifier of the corresponding transmission proxy is an identifier of the transmission proxy 10.

In a possible implementation, the fifth message further includes a weight corresponding to the transmission proxy. For example, when the second service set is the service set 3 in FIG. 2, the fifth message includes at least one of the identifier of the transmission proxy 20 and a weight of the transmission proxy 20, and the identifier of the transmission proxy 30 and a weight of the transmission proxy 30.

Step 408 and step 409 are not sequential. Step 408 may be performed first, or step 409 may be performed first. Alternatively, step 408 and step 409 may be performed at the same time. This is not limited in this application. Step 408 is an optional step.

Step 410. The network registration network element records a correspondence between the identifier of the second service set and the capability information of the second service set.

The capability information of the second service set is the same as the capability information of the third service instance.

With reference to FIG. 2 and FIG. 4A and FIG. 4B, the transmission proxy 10 in FIG. 2 is used as an example. After the service instance a, the service instance b, and the service instance c are all registered with the transmission proxy 10, information stored on the transmission proxy 10 includes at least information shown in Table 1.

TABLE 1

| Information stored on the transmission proxy 10 | | |
| --- | --- | --- |
| Identifier of the service set | Identifier of the service instance | Capability information of the service set |
| 1 | a | Service type, serving area . . . |
| | b | |
| 2 | c | Service type, serving area . . . |

As shown in Table 1, the transmission proxy 10 may store an identifier of the service set, an identifier of the service instance included in the service set, capability information of the service set, and a relationship between the identifier of the service set, the identifier of the service instance included in the service set, and the capability information of the service set. In an implementation, in addition to the foregoing information, the transmission proxy may further store other information in Table 1, for example, manufacturer information, a capacity of the service instance, and load. This is not limited in this application.

With reference to FIG. 2 and FIG. 4A and FIG. 4B, the transmission proxy 10, the transmission proxy 20, and the transmission proxy 30 in FIG. 2 are used as an example. After the transmission proxy 10, the transmission proxy 20, and the transmission proxy 30 are all registered with the network registration network element, information stored on the network registration network element includes at least information shown in Table 2.

TABLE 2

| Information stored on the network registration network element | | |
| --- | --- | --- |
| Identifier of the transmission proxy | Identifier of the service set | Capability information of the service set |
| 10 | 1 | Service type, serving area . . . |
| | 2 | |
| 20 | 3 | Service type, serving area . . . |
| 30 | 1 | Service type, serving area . . . |
| | 2 | |

In an implementation, in addition to the foregoing information, the network registration network element may further store other information in Table 2, for example, manufacturer information, a capacity of the service instance, and load. This is not limited in this embodiment.

In a possible implementation, Table 2 further includes the identifier of the transmission proxy.

In a possible implementation, Table 2 further includes stored weight information corresponding to the transmission proxy.

As shown in Table 2, the network registration network element may store the identifier of the transmission proxy, the identifier of the service set, the capability information of the service set, and a correspondence between the identifier of the transmission proxy, the identifier of the service set, and the capability information of the service set.

In a possible implementation, the third message sent by the third service instance to the first transmission proxy may further carry indication information. The indication information is used to indicate whether the first transmission proxy needs to create the second service set to which the third service instance belongs. In this case, step 402 may not be performed. The first transmission proxy may directly determine, based on the indication information carried in the third message, whether to perform step 403 to step 405 or perform step 407 to step 409.

Figure 5:
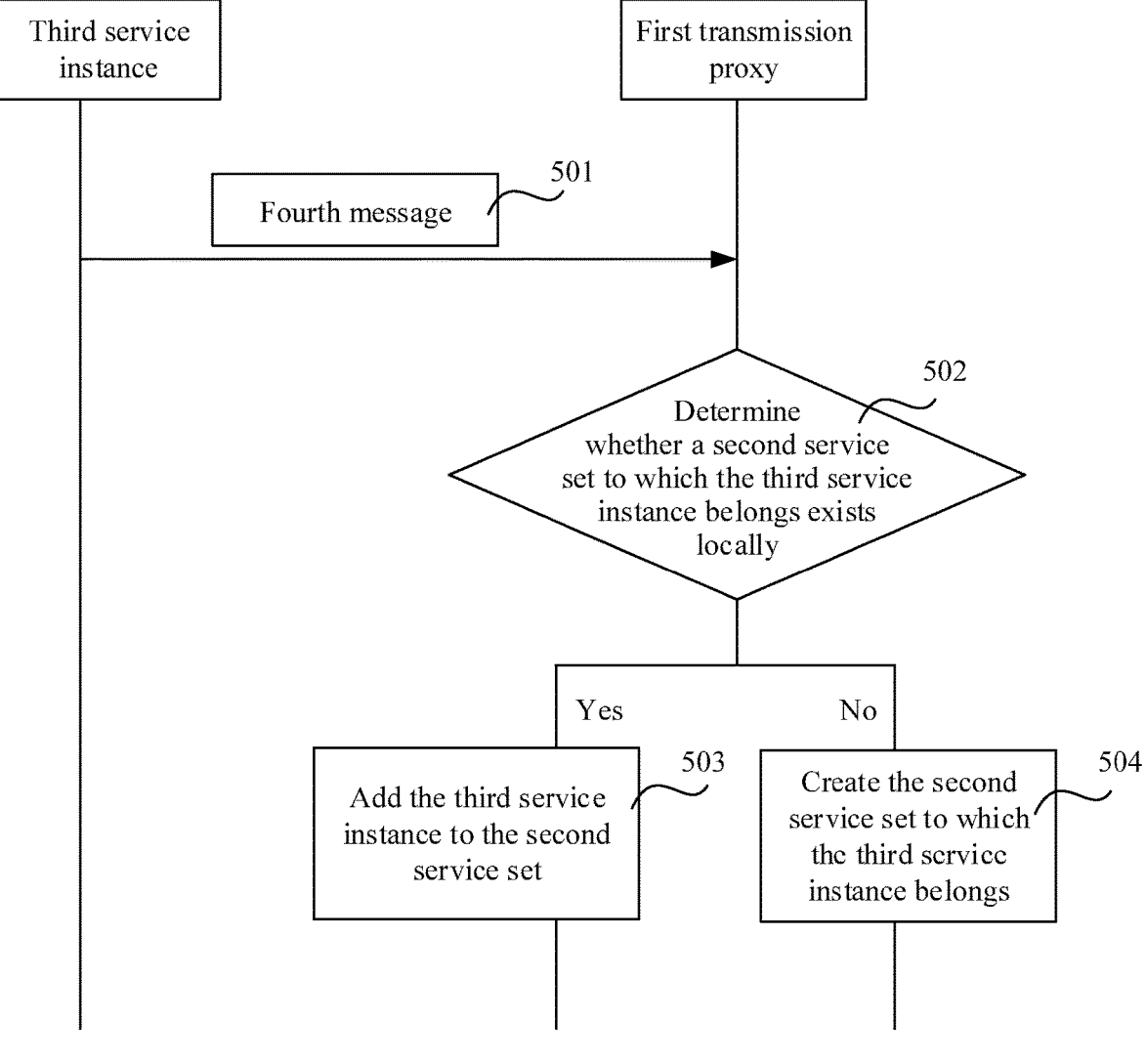
FIG. 5 is a schematic flowchart of another service instance registration method according to an embodiment of this application.

In this application, when a service instance provides a service, a service set to which the service instance belongs may be configured in a configuration file of the service instance, and the service instance registers the configured service set with a transmission proxy connected to the service instance. FIG. 5 is a schematic flowchart of another service instance registration method according to this application. For ease of description of the solution, FIG. 5 is described by using an example in which a transmission proxy connected to a third service instance is the first transmission proxy, that is, the third service instance is registered with the first transmission proxy connected to the third service instance. The third service instance may be any one of the mobility management network element, the session management network element, the policy control network element, the authentication service network element, the data management network element, or the user plane network element in FIG. 1. The first transmission proxy may be any one of the transmission proxy 10, the transmission proxy 20, or the transmission proxy 30 in FIG. 2. If the first transmission proxy is the transmission proxy 10 in FIG. 2, the third service instance may be any one of the service instance a, the service instance b, or the service instance c. If the first transmission proxy is the transmission proxy 20 (or the transmission proxy 30) in FIG. 2, the third service instance may be either of the service instance A and the service instance B. In the foregoing scenario 1, the third service instance may be a first service instance or a second service instance. In the foregoing scenario 2, the third service instance may be the second service instance. In the foregoing scenario 3, the third service instance may be the first service instance. A process, shown in FIG. 5, in which the third service instance is registered with the first transmission proxy is used in registration of any service instance with a transmission proxy connected to the service instance. As shown in FIG. 5, the method includes the following steps.

Step 501. The third service instance sends a fourth message to the first transmission proxy.

The fourth message includes an identifier of the third service instance, an identifier of a second service set to which the third service instance belongs, and capability information of the third service instance.

Correspondingly, the first transmission proxy receives the fourth message from the third service instance.

Optionally, the third service instance may determine, from the configuration file, the identifier of the second service set to which the third service instance belongs.

In a possible implementation, a specific implementation process in which the first transmission proxy adds the third service instance to the second service set to which the third service instance belongs is as follows.

Step 502. The first transmission proxy determines whether the second service set to which the third service instance belongs exists on the first transmission proxy. If the second service set exists on the first transmission proxy, step 503 is performed. If the second service set does not exist on the first transmission proxy, step 504 is performed.

In a possible implementation, the first transmission proxy determines whether the second service set to which the third service instance belongs exists in at least one service set corresponding to the information that is locally stored on the first transmission proxy and that is about the service set.

Step 503. The first transmission proxy adds the third service instance to the second service set to which the third service instance belongs.

In a possible implementation, capacity information of the second service set to which the third service instance belongs is modified.

In a possible implementation, steps after step 503 may be the same as step 405 and step 406 in FIG. 4A and FIG. 4B, and details are not described herein again.

Step 504. The first transmission proxy creates the second service set to which the third service instance belongs.

Capability information of the second service set to which the third service instance belongs is the same as the capability information of the third service instance.

In a possible implementation, that the first transmission proxy creates the second service set to which the third service instance belongs may be specifically the first transmission proxy records the received identifier of the third service instance, the identifier of the second service set to which the third service instance belongs, the capability information of the third service instance, and a relationship between the identifier of the third service instance, the identifier of the second service set, the capability information of the third service instance in a form of Table 1.

In a possible implementation, step 409 and step 410 in FIG. 4B may be performed after step 504. For a specific process, refer to step 409 and step 410 in FIG. 4B. Details are not described herein again.

In the methods in FIG. 4A and FIG. 4B and FIG. 5, the first transmission proxy registers the identifier of the second service set corresponding to the third service instance and the capability information of the second service set with a network registration network element. In this process, the first transmission proxy stores the content shown in Table 1. Alternatively, the third service instance may not be registered with the first transmission proxy, and instead, the identifier of the second service set to which the third service instance belongs and the capability information of the second service set are directly registered with the network registration network element. In this implementation, the third service instance may directly send a fifth message to the network registration network element, and the network registration network element stores the content shown in Table 2. For this implementation, refer to step 409 in FIG. 4B. A difference of the step in this embodiment from step 409 is that the third service instance sends the message to the network registration network element.

Figure 6:
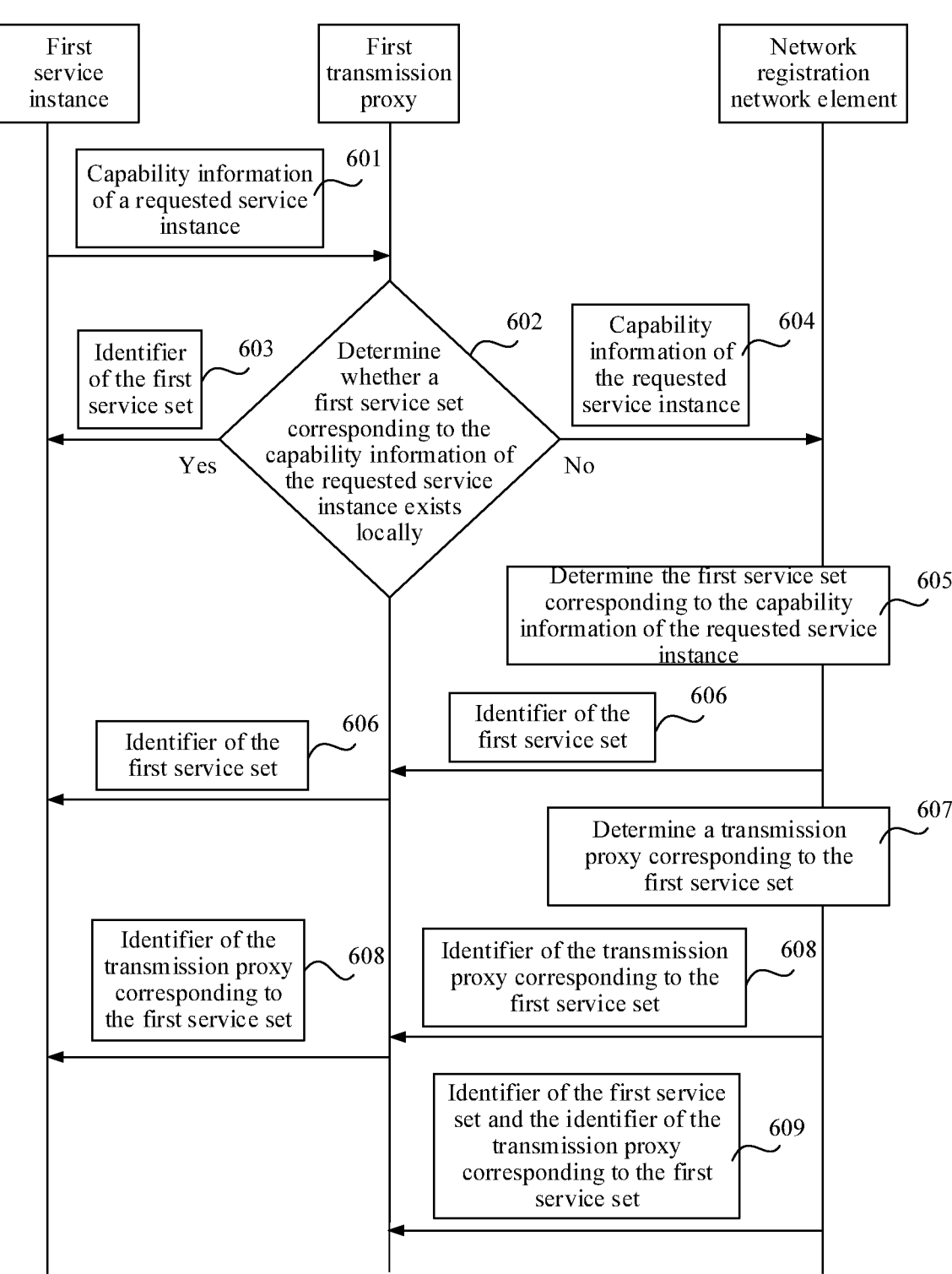
FIG. 6 is a schematic flowchart of a method for obtaining an identifier of a service set by a service instance according to an embodiment of this application.

In this application, after a service instance has been registered with a transmission proxy, and the transmission proxy has registered with a network registration network element, when the service instance needs another service instance to provide a service for the service instance, the service instance may first obtain an identifier of a service set to which the other service instance that is to provide a service for the service instance belongs. FIG. 6 is a schematic flowchart of a method for obtaining an identifier of a service set by a service instance according to this application. FIG. 6 is described by using an example in which a first service instance obtains an identifier of a first service set. The first service instance may be any one of the mobility management network element, the session management network element, the policy control network element, the authentication service network element, the data management network element, or the user plane network element in FIG. 1. The first service set is a service set to which a second service instance that is to provide a service for the first service instance belongs. In FIG. 6, a first transmission proxy is a transmission proxy connected to the first service instance. In other words, a transmission proxy corresponding to the first service instance is the first transmission proxy. With reference to FIG. 2, if the first transmission proxy is the transmission proxy 10 in FIG. 2, the first service instance may be any one of the service instance a, the service instance b, or the service instance c. If the first transmission proxy is the transmission proxy 20 (or the transmission proxy 30) in FIG. 2, the first service instance may be either of the service instance A and the service instance B. As shown in FIG. 6, the method includes the following steps.

Step 601. The first service instance sends capability information of a requested service instance to the first transmission proxy.

The capability information of the requested service instance includes at least one of the following a service type, a capability of a requested network slice, location information of UE, a requested DNN, or the like. "At least one" may be understood as one or more, and plurality means two or more.

In a possible implementation, a process in which the first transmission proxy obtains the identifier of the first service set corresponding to the capability information of the requested service instance is as follows.

Step 602. The first transmission proxy determines whether the first service set corresponding to the capability information of the requested service instance exists on the first transmission proxy. If the first service set exists on the first transmission proxy, step 603 is performed. If the first service set does not exist on the first transmission proxy, step 604 is performed.

Step 603. The first transmission proxy sends, to the first service instance, the identifier of the first service set corresponding to the capability information of the requested service instance.

Correspondingly, the first service instance receives the identifier of the first service set from the first transmission proxy.

Step 604. The first transmission proxy sends the capability information of the requested service instance to the network registration network element.

Correspondingly, the network registration network element receives the capability information of the requested service instance sent by the first transmission proxy.

Step 605. The network registration network element determines the first service set corresponding to the capability information of the requested service instance.

In a possible implementation, capability information of the first service set is the same as the capability information of the requested service instance of the first service instance.

Step 606. The first service instance receives the identifier of the first service set from the network registration network element.

In a possible implementation, the network registration network element first sends the identifier of the first service set to the first transmission proxy, and the first transmission proxy sends the received identifier of the first service set to the first service instance. The first transmission proxy may buffer the identifier of the first service set. Within preset duration, after the first transmission proxy receives the capability information of the requested service instance for a second time, the first transmission proxy may directly determine the first service set without sending the capability information to the network registration network element. This improves efficiency of obtaining the first service set by the first service instance.

Step 607. The network registration network element determines a transmission proxy corresponding to the first service set.

In a possible implementation, if there are a plurality of transmission proxies in the first service set, the network registration network element may determine, based on a weight of each transmission proxy corresponding to the first service set, the transmission proxy corresponding to the first service set. The weight of the transmission proxy may be carried in a fifth message when the transmission proxy sends the fifth message to the network registration network element, or may be sent before or after the fifth message is sent. This is not limited in this application.

Step 605 and step 607 may be performed at the same time. Alternatively, step 605 may be performed before or after step 607.

Step 608. The first service instance receives, from the network registration network element, an identifier of the transmission proxy corresponding to the first service set. In this way, the first service instance can directly send a first message to the first transmission proxy corresponding to the first service set.

Step 606 and step 608 may be performed at the same time. Alternatively, step 606 may be performed before or after step 608.

Step 609. The first transmission proxy receives, from the network registration network element, the identifier of the first service set and the identifier of the transmission proxy corresponding to the first service set.

Optionally, step 609 may be performed simultaneously with step 606 and step 608.

The step 608 and step 609 do not indicate a sequence. If step 608 is performed, step 609 may not be performed. If step 609 is performed, step 608 may not be performed. Step 609 may be implemented in the following manner. When the first transmission proxy is set as an HTTP transmission proxy, and the network registration network element sends, to the first service instance through the first transmission proxy, the identifier of the first service set and the identifier of the transmission proxy corresponding to the first service set, the first transmission proxy (HTTP transmission proxy) may store the identifier of the first service set and the identifier of the transmission proxy corresponding to the first service instance. In this way, when receiving the first message, the first transmission proxy may determine, based on the identifier that is of the first service set that is included in the first message, the transmission proxy corresponding to the first service set, and may directly send the first message to the determined transmission proxy corresponding to the first service set.

In an optional implementation, in step 601, the first service instance may directly send the capability information of the requested service instance to the network registration network element. In a possible implementation, the capability information of the requested service instance may be sent through an HTTP message. A host name of the HTTP message is set to an identifier of the network registration network element, for example, an FQDN of the network registration network element or an IP of the network registration network element. Optionally, the first transmission proxy may be set as an HTTP transmission proxy. The capability information of the requested service instance of the first service instance may be first sent to the HTTP transmission proxy (the first transmission proxy). The HTTP transmission proxy forwards the capability information of the requested service instance to the network registration network element based on a host name of an HTTP message. The network registration network element determines the first service set based on the capability information of the requested service instance, and then the network registration network element sends the identifier of the first service set to the first service instance through the first transmission proxy. If the first transmission proxy is not set as the HTTP transmission proxy, the network registration network element directly sends the identifier of the first service set to the first service instance without forwarding by the first transmission proxy.

In another possible implementation, the capability information of the requested service instance in step 601 may be sent through an HTTP message, and a host name of the HTTP message may be set to the first transmission proxy. The capability information of the service instance requested in step 604 may also be sent through an HTTP message, and a host name of the HTTP message may be set to the network registration network element. In this way, during sending the identifier of the first service set or the identifier of the transmission proxy corresponding to the first service set to the first service instance, the network registration network element may first send, to the first transmission proxy, the identifier of the first service set or the identifier of the transmission proxy corresponding to the first service set. Then, the first transmission proxy sends, to the first service instance, the identifier of the first service set or the identifier of the transmission proxy corresponding to the first service set.

In a possible implementation, the capability information of the requested service instance of the first service instance in FIG. 6 may also be carried in the first message in FIG. 3 for sending. Specifically, the first service instance sends the first message to the first transmission proxy, where the first message further includes the capability information of the requested service instance. A difference of this process from the process in FIG. 3 is that, in this process, the first message does not carry the identifier of the first service set. If the first transmission proxy determines that the first service set corresponding to the information that is locally stored on the first transmission proxy and that is about the service set corresponds to the capability information of the requested service instance, the first transmission proxy may select a second service instance from the first service set, and then send the second message in FIG. 3 to the second service instance. In a possible implementation, the first transmission proxy may delete the capability information of the requested service instance in the first message. In addition, in an implementation, the first transmission proxy may further add identification information of the first service set to the first message, to generate the second message. After receiving the second message, the second service instance processes the second message, and then the second service instance sends a response message for the second message to the first service instance. In a possible implementation, the second service instance may carry the identifier of the first service set to the response message for the second message. In another possible implementation, the second service instance does not carry the identifier of the first service set to the response message for the second message. Instead, after receiving the response message for the second message, the first transmission proxy adds the identifier of the first service set to the response message for the second message, and sends the response message for the second message to the first service instance. In this way, the first service instance does not need to initiate an additional procedure of obtaining the service set to which the requested service instance belongs. Subsequently, when the first service instance sends the first message to the second service instance, the first message may carry the identifier of the first service set, and does not need to carry the capability information of the requested service instance.

After step 303, the second service instance processes the second message. In a possible implementation, if the second message includes one context identifier, the second service instance obtains a user context from a shared database based on the context identifier. The context identifier may be allocated by the second service instance when the second service instance creates the user context, or may be an identifier of a terminal. The second service instance may generate the response message for the second message.

This application provides four implementations in which the second service instance sends the response message for the second message to the first service instance.

Implementation 1. The second service instance directly sends the response message for the second message to the first service instance, where the response message for the second message may be an HTTP message. To enable the second service instance to directly send the response message for the second message to the first service instance, a host name of the HTTP message of the response message for the second message may be set to an identifier of the first service instance. The identifier of the first service instance may be carried in the second message. In a possible implementation, the response message for the second message may further carry the identifier of the first service set.

Implementation 2. The second service instance may first send the response message for the second message to a transmission proxy connected to the second service instance, and the transmission proxy connected to the second service instance forwards the response message for the second message to the first service instance. During specific implementation, the response message for the second message may alternatively be an HTTP message, and a host name of the HTTP message may be set to an identifier of the first service instance. The second service instance may set the transmission proxy connected to the second service instance as an HTTP transmission proxy. The HTTP transmission proxy sends the response message for the second message to the first service instance based on the host name of the HTTP message. The response message for the second message may carry the identifier of the first service set.

Implementation 3. The second service instance may first send the response message for the second message to a transmission proxy connected to the second service instance, and the transmission proxy connected to the second service instance forwards the response message to a transmission proxy connected to the first service instance. Then, the transmission proxy connected to the first service instance forwards the response message to the first service instance. During specific implementation, the response message for the second message may alternatively be an HTTP message, and a host name of the HTTP message may be set to an identifier of the first service instance. The transmission proxy connected to the second service instance may be set as an HTTP transmission proxy. To support the HTTP transmission proxy in sending the response message for the second message to the transmission proxy connected to the first service instance, an IP address corresponding to the identifier of the first service set may be configured, on a DNS, to an IP address of the first transmission proxy. The HTTP transmission proxy sends a domain name resolution request carrying an FQDN of the first service instance to the DNS. Then, the DNS sends, to the HTTP transmission proxy, the IP address of the transmission proxy connected to the first service instance. In this way, the HTTP transmission proxy can send the response message for the second message to the transmission proxy connected to the first service instance. Further, the transmission proxy connected to the first service instance sends the response message for the second message to the first service instance based on the host name of the HTTP message. The response message for the second message may not carry the identifier of the first service set, and the transmission proxy adds the identifier of the first service set to the response message for the second message.

Implementation 4. The second service instance sends the response message for the second message to a transmission proxy connected to the first service instance, and the transmission proxy connected to the first service instance forwards the response message for the second message to the first service instance. During specific implementation, the response message for the second message may alternatively be an HTTP message, and a host name of the HTTP message may be set to an identifier of the first service instance. Specifically, the transmission proxy connected to the first service instance may send the response message for the second message to the first service instance based on the host name of the HTTP message. In this implementation, there is no need to set a transmission proxy connected to the second service instance as an HTTP transmission proxy. The response message for the second message may not carry the identifier of the first service set, and the transmission proxy adds the identifier of the first service set to the response message for the second message.

In an optional implementation, the first message in step 301 may further include an identifier of a service set to which the first service instance belongs. After receiving the identifier of the service set to which the first service instance belongs, the second service instance may store, in the user context, the identifier of the service set to which the first service instance belongs. Then, when subsequently the second service instance actively sends a user-related message to a service instance in the service set to which the first service instance belongs, the second service instance may carry, in the message, the identifier of the service set to which the first service instance belongs.

Figure 7:
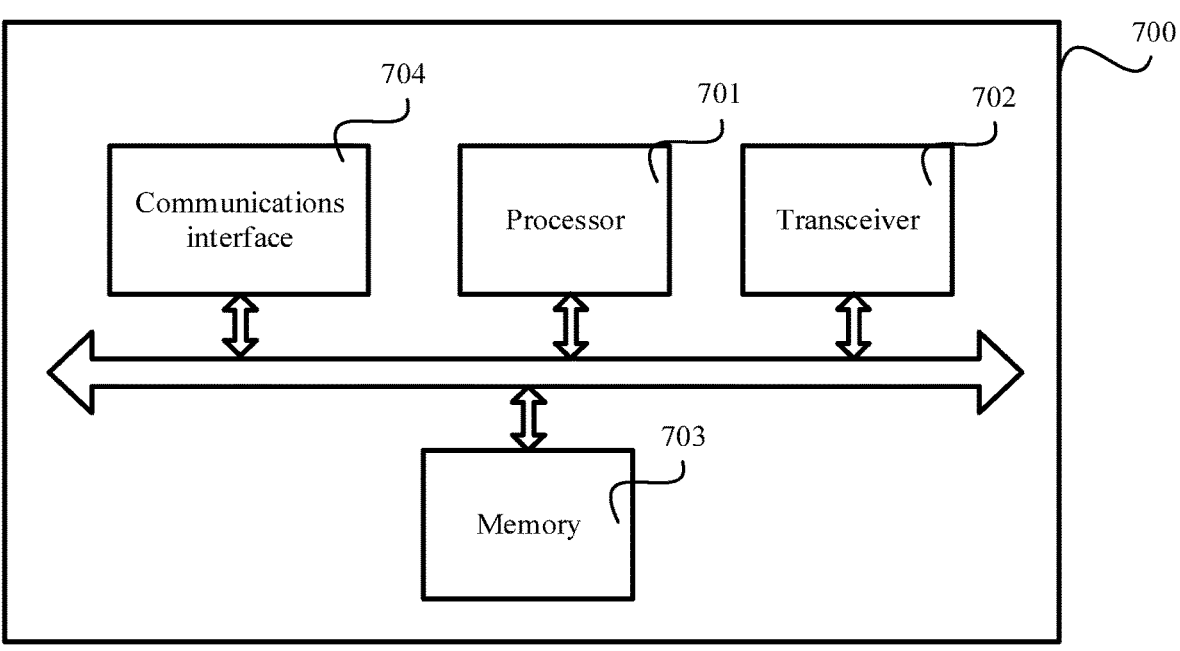
FIG. 7 is a schematic structural diagram of an apparatus according to an embodiment of this application.

Based on the foregoing content and a same concept, this application provides an apparatus 700, configured to perform any one of the solutions on a first transmission proxy side in the foregoing methods. FIG. 7 is an example schematic structural diagram of an apparatus according to this application. As shown in FIG. 7, the apparatus 700 includes a processor 701, a transceiver 702, a memory 703, and a communications interface 704. The processor 701, the transceiver 702, the memory 703, and the communications interface 704 are connected to each other through a bus. The apparatus 700 in this example may be the foregoing first transmission proxy, and may perform the solution correspondingly performed by the first transmission proxy in FIG. 3, the solution correspondingly performed by the first transmission proxy in FIG. 4A and FIG. 4B, or the solution correspondingly performed by the first transmission proxy in FIG. 5. The apparatus 700 may alternatively be the transmission proxy 10, the transmission proxy 20, or the transmission proxy 30 in FIG. 2.

The memory 703 may include a volatile memory, for example, a random-access memory (RAM). Alternatively, the memory 703 may include a non-volatile memory, for example, a flash memory, a hard disk drive (HDD), or a solid-state drive (SSD). Alternatively, the memory 703 may include a combination of the foregoing types of memories.

The communications interface 704 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local access network (WLAN) interface.

The processor 701 may be a central processing unit (CPU), a network processor (NP), or a combination of the CPU and the NP. The processor 701 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Optionally, the memory 703 may be further configured to store a program instruction. The processor 701 invokes the program instruction stored in the memory 703, to perform one or more steps or optional implementations in the foregoing solution in the embodiment, so that the apparatus 700 implements a function of the first transmission proxy in the foregoing method.

The processor 701 is configured to execute an instruction stored in the memory, and control the transceiver 702 to send or receive a signal. When the processor 701 executes the instruction stored in the memory, the processor 701 in the apparatus 700 is configured to obtain a second service instance in a first service set based on an identifier of the first service set. The transceiver 702 is configured to receive a first message from a first service instance, where the first message includes the identifier of the first service set, and send a second message to the second service instance based on the first message.

In a possible implementation, the processor 701 is configured to determine, based on the identifier of the first service set, the first service set from at least one service set corresponding to the information that is locally stored on the first transmission proxy and that is about the service set, and select the second service instance from the first service set.

In a possible implementation, the transceiver 702 is further configured to receive capability information of a requested service instance from the first service instance, and send the identifier of the first service set to the first service instance. The processor 701 is further configured to obtain the identifier of the first service set corresponding to the capability information of the requested service instance.

In a possible implementation, the transceiver 702 is further configured to receive capability information of a requested service instance from the first service instance, and send the identifier of the first service set to the first service instance. The processor 701 is further configured to obtain the identifier of the first service set corresponding to the capability information of the requested service instance.

In a possible implementation, the processor 701 is configured to determine, based on local information, the first service set corresponding to the capability information of the requested service instance.

In a possible implementation, the transceiver 702 is further configured to send the capability information of the requested service instance to a network registration network element, and receive, from the network registration network element, the identifier of the first service set corresponding to the capability information of the requested service instance.

In a possible implementation, the transceiver 702 is further configured to receive, from the network registration network element, an identifier of at least one transmission proxy corresponding to the first service set, and send, to the first service instance, the identifier of the transmission proxy corresponding to the first service set. The processor 701 is further configured to select, from the at least one transmission proxy corresponding to the first service set, an identifier of a transmission proxy corresponding to the first service set.

In a possible implementation, the transceiver 702 is configured to obtain, from the transmission proxy corresponding to the first service set, at least one service instance corresponding to the first service set, and select the second service instance from the obtained at least one service instance.

In a possible implementation, the transceiver 702 is further configured to receive a third message from the third service instance, where the third message includes capability information of the third service instance and an identifier of the third service instance, and the third message is used to request to register the third service instance with the first transmission proxy, and obtain a second service set corresponding to the capability information of the third service instance, and send an identifier of the second service set to the third service instance.

In a possible implementation, the processor 701 is configured to, if the second service set corresponding to the capability information of the third service instance exists, control the transceiver 702 to send the identifier of the second service set to the third service instance, or if the service set corresponding to the capability information of the third service instance does not exist, create the second service set to which the third service instance belongs, and control the transceiver 702 to send the identifier of the second service set to the third service instance. The second service set corresponds to the capability information of the third service instance.

In a possible implementation, the transceiver 702 is further configured to receive a fourth message from the third service instance. The fourth message includes an identifier of the third service instance, the identifier of the second service set to which the third service instance belongs, and the capability information of the third service instance. The processor 701 is further configured to add the third service instance to the second service set to which the third service instance belongs.

In a possible implementation, the processor 701 is configured to, if the second service set to which the third service instance belongs exists, add the third service instance to the second service set. Alternatively, if the second service set to which the third service instance belongs does not exist, the processor 701 creates the second service set to which the third service instance belongs, and adds the third service instance to the second service set. The second service set corresponds to the capability information of the third service instance.

In a possible implementation, the transceiver 702 is further configured to send a fifth message to the network registration network element. The fifth message includes the identifier of the second service set and the capability information of the third service instance corresponding to the second service set, and the fifth message is used to request to register the second service set with the network registration network element.

In a possible implementation, the first message is a HTTP message. The HTTP message includes a message header, and the message header includes the identifier of the first service set.

In a possible implementation, the transceiver 702 is configured to receive the first message from the transmission proxy corresponding to the first service set. The first message from the transmission proxy corresponding to the first service set is from the first service instance.

Figure 8:
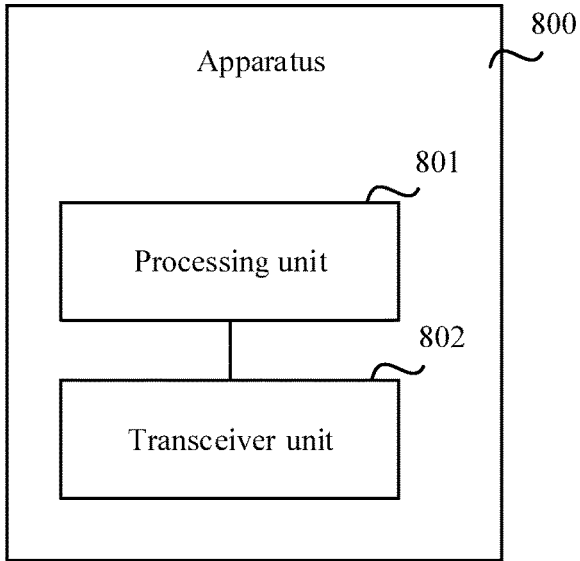
FIG. 8 is a schematic structural diagram of an apparatus according to an embodiment of this application.

Based on the foregoing content and a same concept, this application provides an apparatus 800, configured to perform any one of the solutions on a first transmission proxy side in the foregoing methods. FIG. 8 is an example schematic structural diagram of an apparatus according to this application. As shown in FIG. 8, the apparatus 800 includes a processing unit 801 and a transceiver unit 802. The apparatus 800 in this example may be the foregoing first transmission proxy, and may perform the solution correspondingly performed by the first transmission proxy in FIG. 3, the solution correspondingly performed by the first transmission proxy in FIG. 4A and FIG. 4B, or the solution correspondingly performed by the first transmission proxy in FIG. 5. The apparatus 800 may alternatively be the transmission proxy 10, the transmission proxy 20, or the transmission proxy 30 in FIG. 2.

The processing unit 801 is configured to obtain a second service instance in a first service set based on an identifier of the first service set. The transceiver unit 802 is configured to receive a first message from a first service instance, where the first message includes the identifier of a first service set, and send a second message to the second service instance based on the first message.

It should be understood that division into units of the foregoing apparatus is merely logical function division. During actual implementation, all or some of the units may be integrated into a physical entity, or may be physically separated. In this application, the processing unit 801 in FIG. 8 may be implemented by the processor 701 in FIG. 7, and the transceiver unit 802 may be implemented by the transceiver 702 in FIG. 7. In other words, in this application, the processing unit 801 may perform the solution performed by the processor 701 in FIG. 7, and the transceiver unit 802 may perform the solution performed by the transceiver 702 in FIG. 7. For details, refer to the foregoing content. Details are not described herein again.

Figure 9:
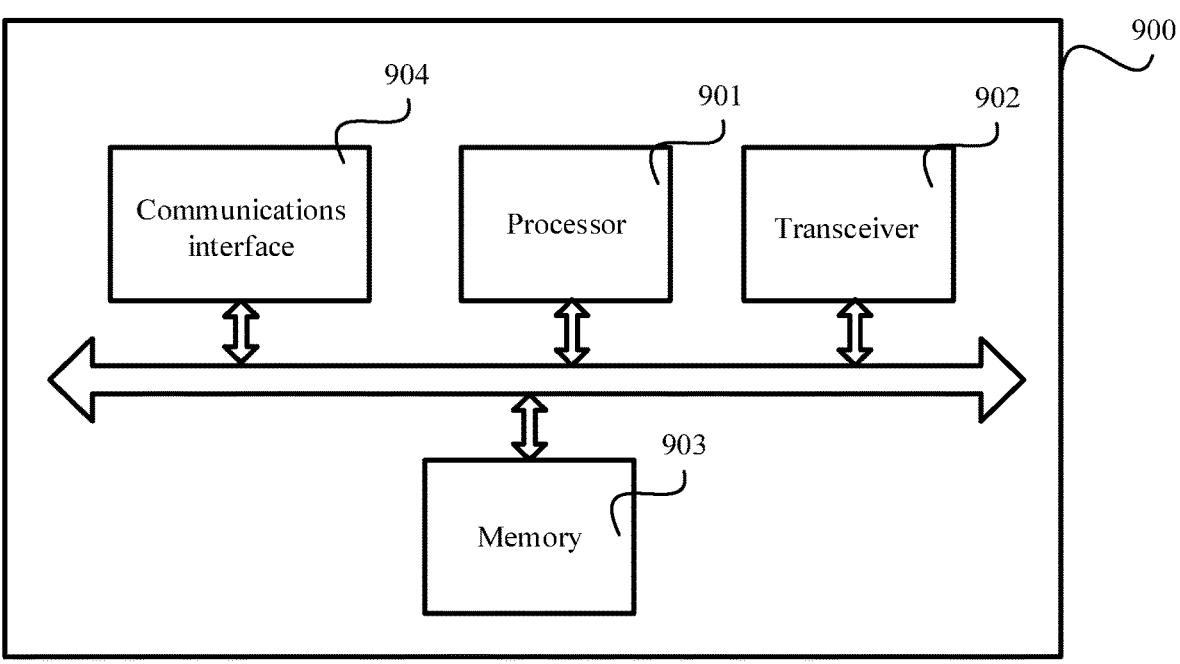
FIG. 9 is a schematic structural diagram of an apparatus according to an embodiment of this application.

Based on the foregoing content and a same concept, this application provides an apparatus 900, configured to perform any one of the solutions on a first service instance side or any one of the solutions on a third service instance side in the foregoing methods. FIG. 9 is an example schematic structural diagram of an apparatus according to this application. As shown in FIG. 9, the apparatus 900 includes a processor 901, a transceiver 902, a memory 903, and a communications interface 904. The processor 901, the transceiver 902, the memory 903, and the communications interface 904 are connected to each other through a bus. The apparatus 900 in this example may be the foregoing first service instance or the third service instance, and may perform the solution correspondingly performed by the first service instance in FIG. 3, the solution correspondingly performed by the third service instance in FIG. 4A and FIG. 4B, or the solution correspondingly performed by the third service instance in FIG. 5. The apparatus 900 may alternatively be any one of the service instance a, the service instance b, the service instance c, the service instance A, or the service instance B in FIG. 2.

The memory 903 may include a volatile memory, for example, a RAM. Alternatively, the memory 903 may include a non-volatile memory, for example, a flash memory, a HDD, or a SSD. Alternatively, the memory 903 may include a combination of the foregoing types of memories.

The communications interface 904 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 901 may be a CPU 901, a NP 901, or a combination of a CPU and an NP. The processor 901 may further include a hardware chip. The hardware chip may be an ASIC, a PLD, or a combination thereof. The PLD may be a CPLD, a FPGA, GAL, or any combination thereof.

Optionally, the memory 903 may be further configured to store a program instruction. The processor 901 invokes the program instruction stored in the memory 903, to perform one or more steps or an optional implementation in the foregoing solution in the embodiment, so that the apparatus 900 implements a function of the first service instance or the third service instance in the foregoing method.

The processor 901 is configured to execute an instruction stored in the memory, and control the transceiver 902 to send or receive a signal. When the processor 901 executes the instruction stored in the memory, the processor 901 in the apparatus 900 is configured to obtain a second service instance in a first service set based on an identifier of the first service set. The transceiver 902 is configured to obtain the identifier of the first service set under control of the processor 901. The first service set includes at least one service instance, and the at least one service instance includes the second service instance. The transceiver 902 is configured to send a first message to a first transmission proxy, where the first message includes the identifier of the first service set.

In a possible implementation, the transceiver 902 is configured to send capability information of a requested service instance of the first service instance to a transmission proxy corresponding to the first service instance, and receive, from the transmission proxy corresponding to the first service instance, the identifier of the first service set corresponding to the capability information of the requested service instance.

In a possible implementation, the transceiver 902 is further configured to send the capability information of the requested service instance of the first service instance to the transmission proxy corresponding to the first service instance, and receive, from the second service instance, the identifier of the first service set corresponding to the capability information of the requested service instance.

In a possible implementation, the transceiver 902 is further configured to send capability information of a requested service instance of the first service instance to a network registration network element, and receive, from the network registration network element or from the transmission proxy corresponding to the first service instance, the identifier of the first service set corresponding to the capability information of the requested service instance.

In a possible implementation, the transceiver 902 is further configured to receive, from the network registration network element, an identifier of a transmission proxy corresponding to the first service set.

Figure 10:
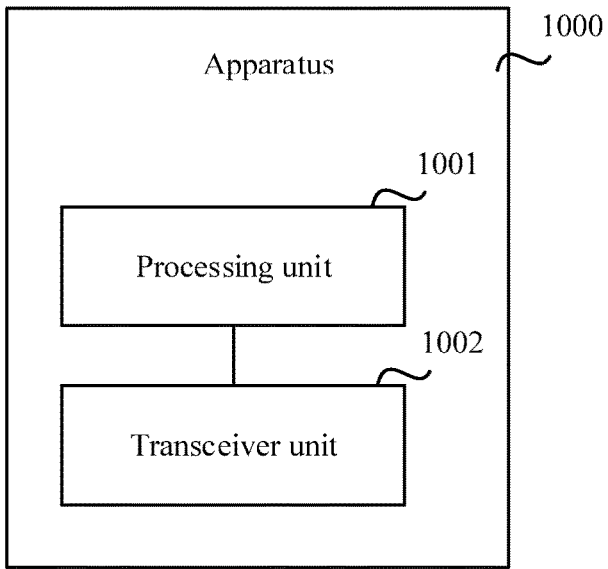
FIG. 10 is a schematic structural diagram of an apparatus according to an embodiment of this application.

Based on the foregoing content and a same concept, this application provides an apparatus 1000, configured to perform any one of the solutions on a first service instance side in the foregoing methods. FIG. 10 is an example schematic structural diagram of an apparatus according to this application. As shown in FIG. 10, the apparatus 1000 includes a processing unit 1001 and a transceiver unit 1002. The apparatus 1000 in this example may be the foregoing first service instance or the third service instance, and may perform the solution correspondingly performed by the first service instance in FIG. 3, the solution correspondingly performed by the third service instance in FIG. 4A and FIG. 4B, or the solution correspondingly performed by the third service instance in FIG. 5. The apparatus 1000 may alternatively be any one of the service instance a, the service instance b, the service instance c, the service instance A, or the service instance B in FIG. 2.

The transceiver unit 1002 is configured to obtain an identifier of a first service set under control of the processing unit 1001, where the first service set includes at least one service instance, and the at least one service instance includes a second service instance, and send a first message to a first transmission proxy, where the first message includes the identifier of the first service set.

It should be understood that division into units of the foregoing apparatus is merely logical function division. During actual implementation, all or some of the units may be integrated into a physical entity, or may be physically separated. In this application, the processing unit 1001 in FIG. 10 may be implemented by the processor 901 in FIG. 9, and the transceiver unit 1002 may be implemented by the transceiver 902 in FIG. 9. In other words, in this application, the processing unit 1001 may perform the solution performed by the processor 901 in FIG. 9, and the transceiver unit 1002 may perform the solution performed by the transceiver 902 in FIG. 9. For details, refer to the foregoing content. Details are not described herein again.

Figure 11:
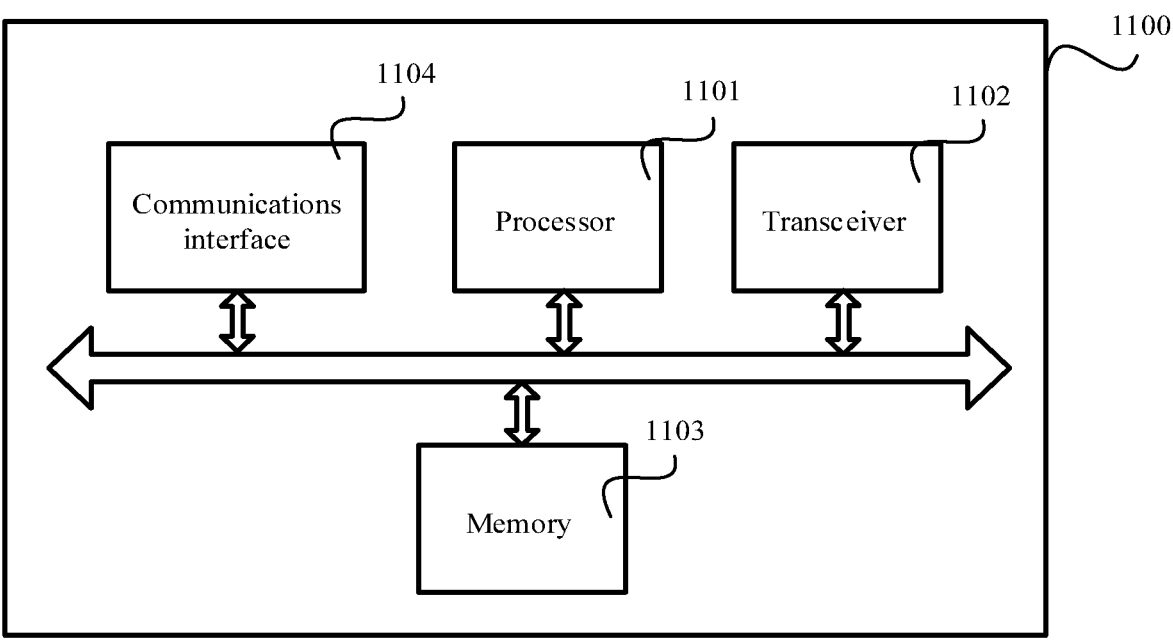
FIG. 11 is a schematic structural diagram of an apparatus according to an embodiment of this application.

Based on the foregoing content and a same concept, this application provides an apparatus 1100, configured to perform any one of the solutions on a network registration network element side in the foregoing methods. FIG. 11 is an example schematic structural diagram of an apparatus according to this application. As shown in FIG. 11, the apparatus 1100 includes a processor 1101, a transceiver 1102, a memory 1103, and a communications interface 1104. The processor 1101, the transceiver 1102, the memory 1103, and the communications interface 1104 are connected to each other through a bus. The apparatus 1100 in this example may be the foregoing network registration network element, and may perform the solution correspondingly performed by the network registration network element in FIG. 3, the solution correspondingly performed by the network registration network element in FIG. 4A and FIG. 4B, or the solution correspondingly performed by the network registration network element in FIG. 5.

The memory 1103 may include a volatile memory, for example, a RAM. Alternatively, the memory 1103 may include a non-volatile memory, for example, a flash memory, a HDD, or a SSD. Alternatively, the memory 1103 may include a combination of the foregoing types of memories.

The communications interface 1104 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 1101 may be a CPU 1101, a NP 1101, or a combination of a CPU and an NP. The processor 1101 may further include a hardware chip. The hardware chip may be an ASIC, a PLD, or a combination thereof. The PLD may be a CPLD, a FPGA, GAL, or any combination thereof.

Optionally, the memory 1103 may be further configured to store a program instruction. The processor 1101 invokes the program instruction stored in the memory 1103, to perform one or more steps or an optional implementation in the foregoing solution in the embodiment, so that the apparatus 1100 implements a function of the first service instance or the third service instance in the foregoing method.

The processor 1101 is configured to execute an instruction stored in the memory, and control the transceiver 1102 to send or receive a signal. When the processor 1101 executes the instruction stored in the memory, the transceiver 1102 in the apparatus 1100 is configured to receive a fifth message from a transmission proxy corresponding to the third service instance. The fifth message includes an identifier of a second service set and capability information of the second service set. The processor 1101 is configured to record a correspondence between the identifier of the second service set and the capability information of the second service set. The second service set includes at least one service instance.

In a possible implementation, the transceiver 1102 is further configured to receive a sixth message from the transmission proxy corresponding to the third service instance. The sixth message includes the identifier of the second service set and current capacity information of the second service set.

The processor 1101 is configured to update the capacity information in the capability information of the second service set based on the current capacity information of the second service set.

In a possible implementation, the transceiver 1101 is further configured to receive capability information of a requested service instance from the first service instance, and send an identifier of a first service set to the first service instance. The processor 1101 is configured to determine the first service set corresponding to the capability information of the requested service instance.

In a possible implementation, the processor 1101 is further configured to determine an identifier of a transmission proxy corresponding to the first service set. The transceiver 1102 is further configured to send, to the first service instance, the identifier of the transmission proxy corresponding to the first service set.

In a possible implementation, the transceiver 1102 is further configured to send, to the transmission proxy corresponding to the third service instance, the identifier of the first service set and the identifier of the transmission proxy corresponding to the first service set.

In a possible implementation, the processor 1101 is configured to determine, based on an obtained weight of the transmission proxy corresponding to the first service set, the identifier of the transmission proxy corresponding to the first service set.

Figure 12:
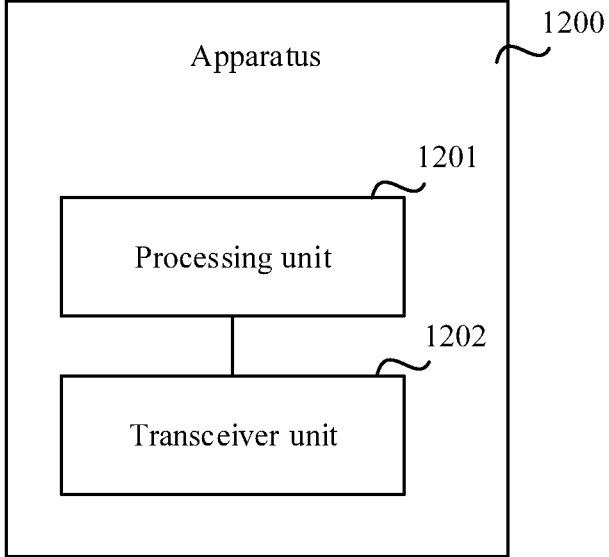
FIG. 12 is a schematic structural diagram of an apparatus according to an embodiment of this application.

Based on the foregoing content and a same concept, this application provides an apparatus 1200, configured to perform any one of the solutions on a network registration network element side in the foregoing methods. FIG. 12 is an example schematic structural diagram of an apparatus according to this application. As shown in FIG. 12, the apparatus 1200 includes a processing unit 1201 and a transceiver unit 1202. The apparatus 1200 in this example may be the foregoing network registration network element, and may perform the solution correspondingly performed by the network registration network element in FIG. 3, the solution correspondingly performed by the network registration network element in FIG. 4A and FIG. 4B, or the solution correspondingly performed by the network registration network element in FIG. 5.

The transceiver unit 1202 is configured to receive a fifth message from a transmission proxy corresponding to a third service instance, where the fifth message includes an identifier of a second service set and capability information of the second service set. The processing unit 1201 is configured to record a correspondence between the identifier of the second service set and the capability information of the second service set. The second service set includes at least one service instance.

It should be understood that division into units of the foregoing apparatus is merely logical function division. During actual implementation, all or some of the units may be integrated into a physical entity, or may be physically separated. In this application, the processing unit 1201 in FIG. 12 may be implemented by the processor 1101 in FIG. 11, and the transceiver unit 1202 may be implemented by the transceiver 1102 in FIG. 11. In other words, in this application, the processing unit 1201 may perform the solution performed by the processor 1101 in FIG. 11, and the transceiver unit 1202 may perform the solution performed by the transceiver 1102 in FIG. 11. For details, refer to the foregoing content. Details are not described herein again.

All or some of the foregoing embodiments may be implemented by using software, hardware, or a combination thereof. When a software program is used to implement the embodiments, the embodiments may be implemented completely or partially in a form of a computer program product. The computer program product includes one or more instructions. When a computer program instruction is loaded and executed on a computer, the procedures or functions according to the embodiments of this application are completely or partially generated. The computer may be a general-purpose computer, a special-purpose computer, a computer network, or another programmable apparatus. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, a fiber, or a twisted pair) or wireless (for example, infrared, radio, or microwave) manner. The computer storage medium may be any medium accessible by a computer, or a data storage device, such as a server or a data center, integrating one or more media. The medium may be a magnetic medium (for example, a floppy disk, a hard disk, a magnetic tape, or a magnetic optical disc (MO)), an optical medium (for example, an optical disc), a semiconductor medium (for example, a read-only memory (ROM), and erasable programmable ROM (EPROM), an electrically EPROM (EEPROM), or a SSD)), or the like.

The embodiments of this application are described with reference to the flowcharts and/or block diagrams of the method, the device (system), and the computer program product according to the embodiments of this application. It should be understood that instructions may be used to implement each procedure and/or each block in the flowcharts and/or the block diagrams and a combination of a procedure and/or a block in the flowcharts and/or the block diagrams. These instructions may be provided for a general-purpose computer, a special-purpose computer, an embedded processor, or a processor of any other programmable data processing device to generate a machine, so that the instructions executed by the computer or the processor of any other programmable data processing device generate an apparatus for implementing a specific function in one or more procedures in the flowcharts and/or in one or more blocks in the block diagrams.

What is claimed is:

1. A message transmission system comprising:
service sets comprising a first service set, wherein the first service set has a first identifier and comprises at least one service instance, wherein the at least one service instance comprises a second service instance, wherein each of the at least one service instance has a same capability information, and wherein the capability information comprises a capability of a supported network slice, a capacity, or a data network name (DNN);
a first service instance configured to:
obtain the first identifier; and
send a first message, wherein the first message is a Hypertext Transfer Protocol (HTTP) message comprising a message header, and wherein the message header comprises the first identifier;
a second transmission proxy connected to the first service instance and configured to:
receive the first message from the first service instance; and
send the first message; and
a first transmission proxy connected to the service sets, based on the first identifier, and configured to:
receive the first message from the second transmission proxy;
obtain the second service instance from the first service set identified by the first identifier; and
send a second message to the second service instance based on the first message,
wherein the first identifier enables determination of the first transmission proxy.

2. The message transmission system of claim 1, wherein the first service instance is further configured to obtain the first identifier by:
receiving, from the second service instance, a response message comprising the first identifier; and
obtaining the first identifier from the response message.

3. The message transmission system of claim 1, wherein the first service instance is further configured to obtain the first identifier by:
sending the capability information of a requested service instance of the first service instance to a network registration network element; and
receiving the first identifier from the network registration network element, wherein the at least one service instance provides the capability information.

4. The message transmission system of claim 3, wherein the first service instance is further configured to receive a second identifier of the first transmission proxy from the network registration network element, and wherein the first transmission proxy corresponds to the first service set.

5. The message transmission system of claim 3, wherein the capability information further comprises a serving area or a service type.

6. The message transmission system of claim 1, wherein the first transmission proxy is further configured to further obtain the second service instance by:

determining the first service set based on the first identifier; and determining the second service instance in the first service set based on a load status of each of the at least one service instance.

7. A message transmission method comprising:

obtaining, by a first service instance, a first identifier of a first service set, wherein the first identifier enables determination of a first transmission proxy that is based on the first identifier, wherein the first service set comprises at least one service instance, wherein the at least one service instance comprises a second service instance, wherein each of the at least one service instance has a same capability information, and wherein the capability information comprises a capability of a supported network slice, a capacity, or a data network name (DNN);

sending, by the first service instance to a second transmission proxy connected to the first service instance, a first message, wherein the first message is a Hypertext Transfer Protocol (HTTP) message comprising a message header, and wherein the message header comprises the first identifier;

receiving, by the second transmission proxy from the first service instance, the first message;

sending, by the second transmission proxy to the first transmission proxy, the first message;

receiving, by the first transmission proxy from the second transmission proxy, the first message, wherein the first transmission proxy is connected to service sets comprising the first service set;

obtaining, by the first transmission proxy, the second service instance from the first service set identified by the first identifier; and sending, by the first transmission proxy to the second service instance, a second message based on the first message.

8. The message transmission method of claim 7, wherein obtaining the first identifier comprises:

receiving, by the first service instance from the second service instance, a response message comprising the first identifier; and obtaining, by the first service instance from the response message, the first identifier.

9. The message transmission method of claim 7, wherein obtaining the first identifier comprises:

sending, by the first service instance to a network registration network element, the capability information of a requested service instance of the first service instance; and receiving, by the first service instance from the network registration network element, the first identifier, wherein the at least one service instance provides the capability information.

10. The message transmission method of claim 9, further comprising receiving, by the first service instance from the network registration network element, a second identifier of the first transmission proxy, wherein the first transmission proxy corresponds to the first service set.

11. The message transmission method of claim 9, wherein the capability information further comprises a serving area or a service type.

12. The message transmission method of claim 7, wherein obtaining, by the first transmission proxy, the second service instance comprises:

determining the first service set based on the first identifier; and determining the second service instance in the first service set based on a load status of each of the at least one service instance.

13. A first service instance apparatus comprising:

a memory configured to store instructions; and one or more processors coupled to the memory and configured to execute the instructions to cause the first service instance apparatus to:

obtain a first identifier of a first service set, wherein the first identifier enables determination of a first transmission proxy that is based on the first identifier, wherein the first service set comprises at least one service instance, wherein the at least one service instance comprises a second service instance, wherein each of the at least one service instance has a same capability information, and wherein the capability information comprises a capability of a supported network slice, a capacity, or a data network name (DNN); and send a first message to a second transmission proxy connected to the first service instance apparatus to enable the second transmission proxy to send the first message to the first transmission proxy, wherein the first message is a Hypertext Transfer Protocol (HTTP) message comprising a message header, and wherein the message header comprises the first identifier.

14. The first service instance apparatus of claim 13, wherein the one or more processors are further configured to execute the instructions to cause the first service instance apparatus to obtain the first identifier by:

receiving, from the second service instance, a response message comprising the first identifier; and obtaining the first identifier from the response message.

15. The first service instance apparatus of claim 13, wherein the one or more processors are further configured to execute the instructions to cause the first service instance apparatus to obtain the first identifier by:

sending the capability information of a requested service instance of the first service instance apparatus to a network registration network element; and receiving the first identifier from the network registration network element, wherein the at least one service instance provides the capability information.

16. The first service instance apparatus of claim 15, wherein the one or more processors are further configured to execute the instructions to cause the first service instance apparatus to receive a second identifier of the first transmission proxy from the network registration network element, and wherein the first transmission proxy corresponds to the first service set.

17. The first service instance apparatus of claim 15, wherein the capability information further comprises a serving area or a service type.

* * * * *